United States Patent
Yang et al.

(10) Patent No.: US 12,190,595 B2
(45) Date of Patent: Jan. 7, 2025

(54) INFORMATION PROCESSING APPARATUS, INFORMATION PROCESSING SYSTEM, AND INFORMATION PROCESSING METHOD

(71) Applicant: SONY GROUP CORPORATION, Tokyo (JP)

(72) Inventors: Seungha Yang, Tokyo (JP); Ryuta Satoh, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 585 days.

(21) Appl. No.: 17/292,345

(22) PCT Filed: Oct. 23, 2019

(86) PCT No.: PCT/JP2019/041483
§ 371 (c)(1),
(2) Date: May 7, 2021

(87) PCT Pub. No.: WO2020/100540
PCT Pub. Date: May 22, 2020

(65) Prior Publication Data
US 2022/0004777 A1 Jan. 6, 2022

(30) Foreign Application Priority Data
Nov. 15, 2018 (JP) .................................. 2018-214754

(51) Int. Cl.
*G06K 9/00* (2022.01)
*B60W 40/02* (2006.01)
(Continued)

(52) U.S. Cl.
CPC .............. *G06V 20/56* (2022.01); *B60W 40/02* (2013.01); *G01S 19/20* (2013.01); *G06F 18/22* (2023.01);
(Continued)

(58) Field of Classification Search
CPC ........ G06V 20/52; G06V 20/53; G06V 20/56; G06V 20/58; G06V 10/20; G06V 10/22;
(Continued)

(56) References Cited

U.S. PATENT DOCUMENTS

2015/0254529 A1* 9/2015 Lv ..................... G06V 10/768
382/159
2016/0092736 A1* 3/2016 Mai ..................... G06V 40/10
382/103
(Continued)

FOREIGN PATENT DOCUMENTS

JP 2010-079561 A 4/2010
JP 2016-033729 A 3/2016
(Continued)

OTHER PUBLICATIONS

International Search Report and Written Opinion of PCT Application No. PCT/JP2019/041483, issued on Jan. 28, 2020, 09 pages of ISRWO.

*Primary Examiner* — Edward F Urban
*Assistant Examiner* — Duy Tran
(74) *Attorney, Agent, or Firm* — CHIP LAW GROUP

(57) ABSTRACT

Provided is an image analysis unit which analyzes a captured image of a camera mounted on a mobile device, executes object identification of an image, and sets a label as an identification result to an image region; a low-confidence region extraction unit which extracts a region with low confidence of object identification from an image analysis result; and a label updating unit which updates a label of the low-confidence region on the basis of information received via a communication unit. The label updating unit updates a label in a case where a matching rate between an object region analyzed from information received via the commu- (Continued)

nication unit and the low-confidence region is equal to or greater than a specified threshold.

13 Claims, 22 Drawing Sheets

(51) Int. Cl.
| | |
|---|---|
| *G01S 19/20* | (2010.01) |
| *G06F 18/22* | (2023.01) |
| *G06K 9/20* | (2006.01) |
| *G06K 9/62* | (2022.01) |
| *G06V 10/22* | (2022.01) |
| *G06V 20/56* | (2022.01) |
| *G08G 1/16* | (2006.01) |
| *H04W 4/02* | (2018.01) |
| *B60W 30/085* | (2012.01) |
| *B60W 30/095* | (2012.01) |

(52) U.S. Cl.
CPC ............... *G06V 10/22* (2022.01); *G08G 1/16* (2013.01); *H04W 4/02* (2013.01); *B60W 30/085* (2013.01); *B60W 30/0956* (2013.01); *B60W 2420/403* (2013.01); *B60W 2556/45* (2020.02)

(58) Field of Classification Search
CPC ........ G06V 20/70; G06V 20/80; G01S 19/20; G08G 1/16; G08G 1/161; G08G 1/017; G08G 1/0175; H04W 4/02; H04W 4/021; B60W 40/00; B60W 40/02; B60W 2556/45; B60W 30/08; B60W 2030/082; B60W 30/085; B60W 30/095; B60W 30/0953; B60W 30/0956; B60W 30/16; B60W 2420/40; B60W 2420/403; B60W 2554/40; B60W 2554/80

See application file for complete search history.

(56) References Cited

U.S. PATENT DOCUMENTS

| | | | |
|---|---|---|---|
| 2017/0101056 A1* | 4/2017 | Park | G08G 1/162 |
| 2017/0140227 A1 | 5/2017 | Takemura et al. | |
| 2017/0332198 A1* | 11/2017 | Dannenbring | G01C 21/3841 |
| 2018/0204562 A1* | 7/2018 | Gong | G06V 10/82 |

FOREIGN PATENT DOCUMENTS

| | | |
|---|---|---|
| JP | 2017-215940 A | 12/2017 |
| JP | 2018-026718 A | 2/2018 |

* cited by examiner

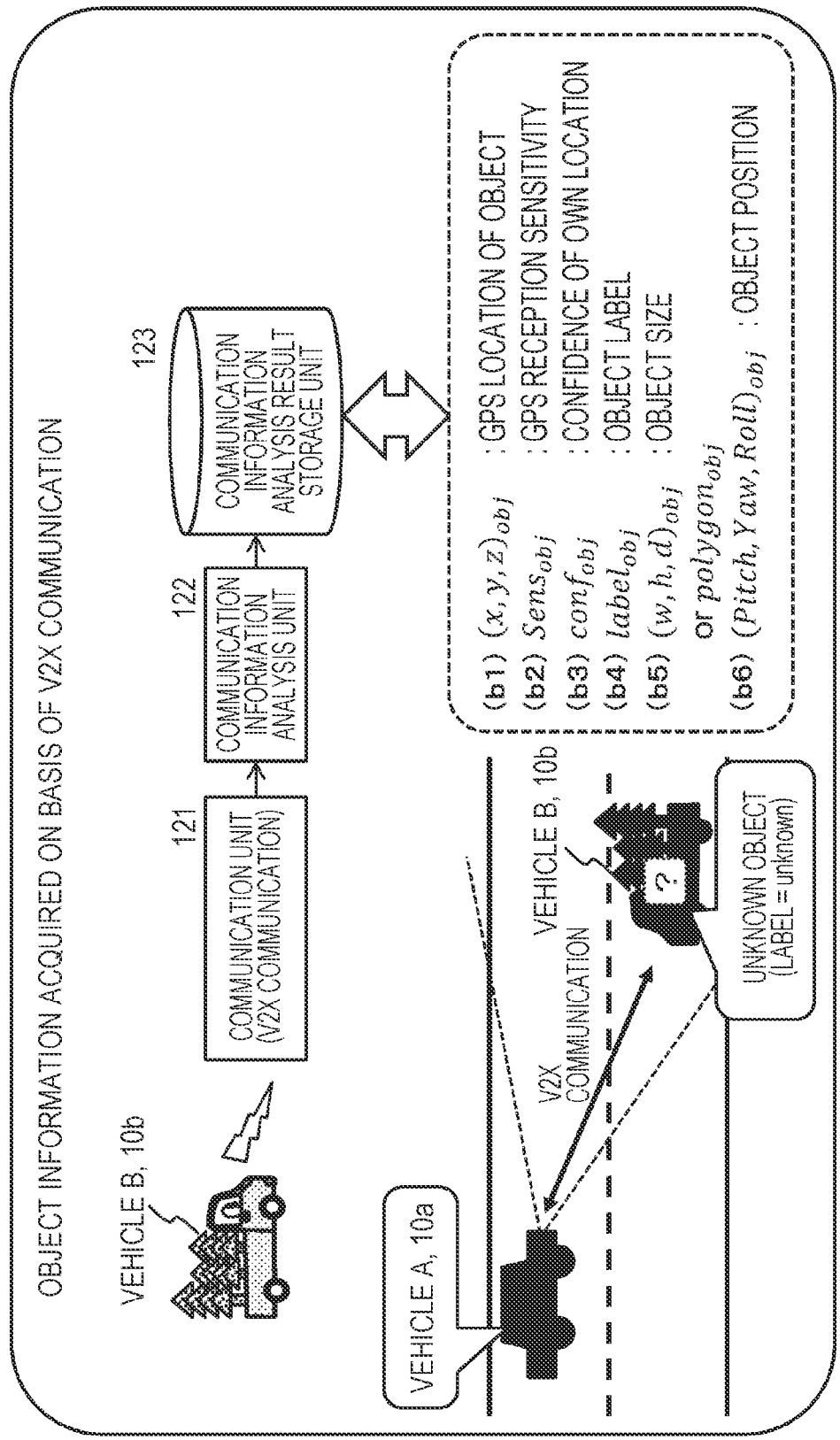

FIG. 8

CALCULATION PROCESSING EXAMPLE OF CONFIDENCE ($conf_{obj}$) OF OBJECT LOCATION

124
HIGH-CONFIDENCE REGION EXTRACTION UNIT (PROCESSING EXAMPLE 1) OBJECT LOCATION CONFIDENCE ($conf_{obj}$) RECEIVED FROM COMMUNICATION PARTNER BY V2X COMMUNICATION IS USED (PROCESSING EXAMPLE 2) CALCULATION IS PERFORMED WITH USE OF GPS RECEPTION SENSITIVITY ($Sens_{obj}$) RECEIVED FROM COMMUNICATION PARTNER BY V2X COMMUNICATION.
(IN CASE OF LOCATION INFORMATION OTHER THAN GPS, CORRESPONDENCE DATA OF THIS LOCATION INFORMATION AND MEASUREMENT ACCURACY INFORMATION CAN BE USED)

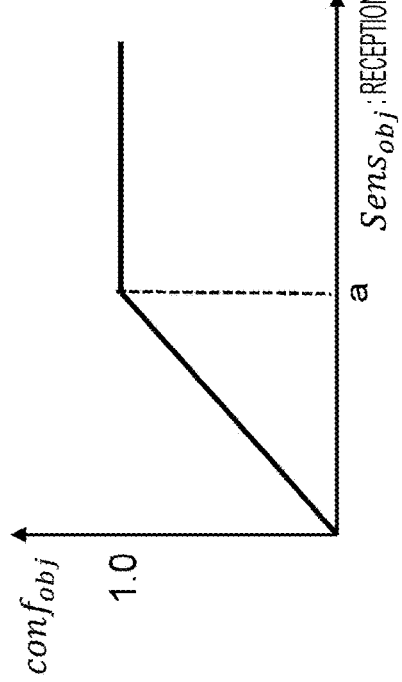

$conf_{obj}$
1.0
a
$Sens_{obj}$: RECEPTION SENSITIVITY (MEASUREMENT ACCURACY INFORMATION)

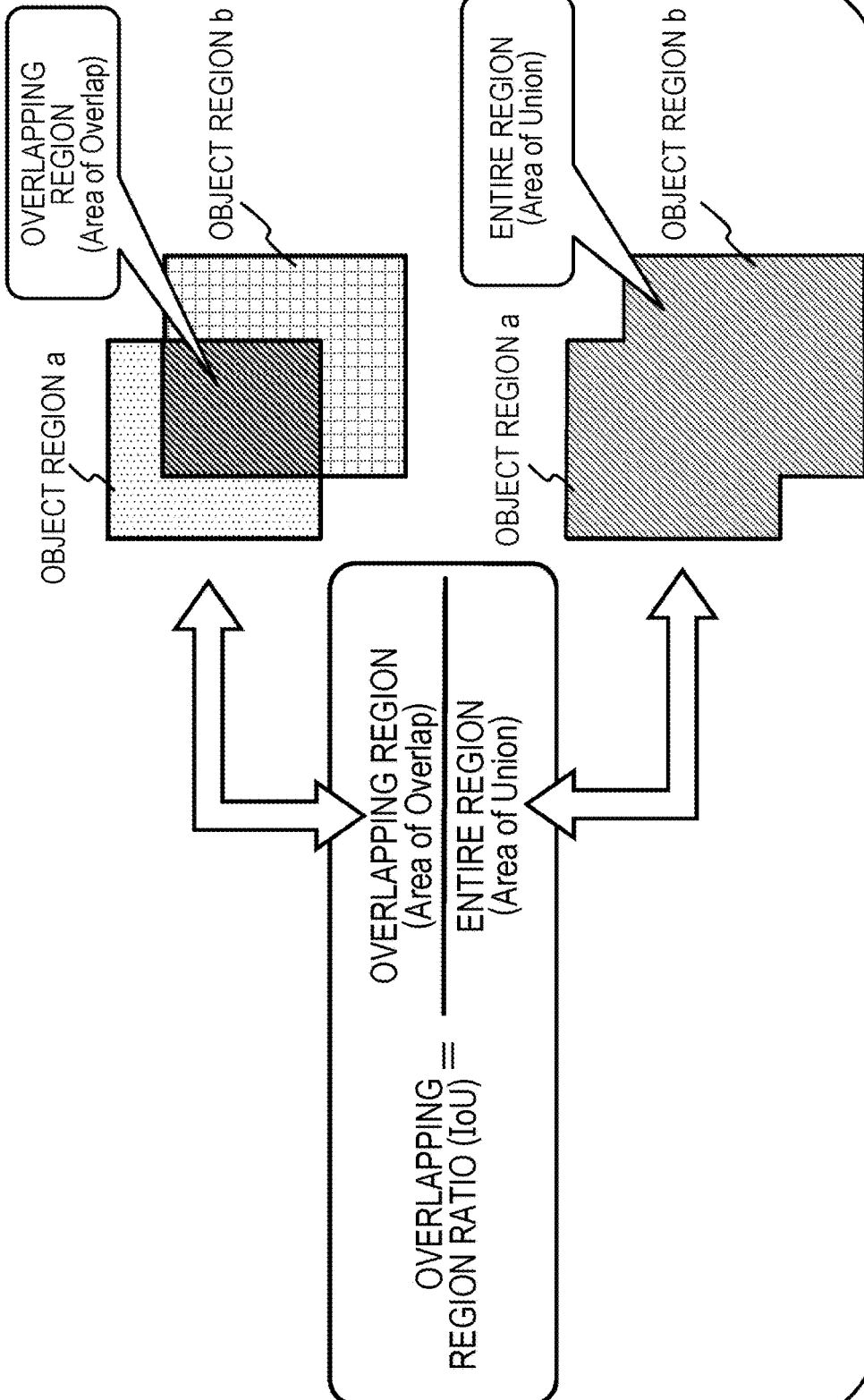

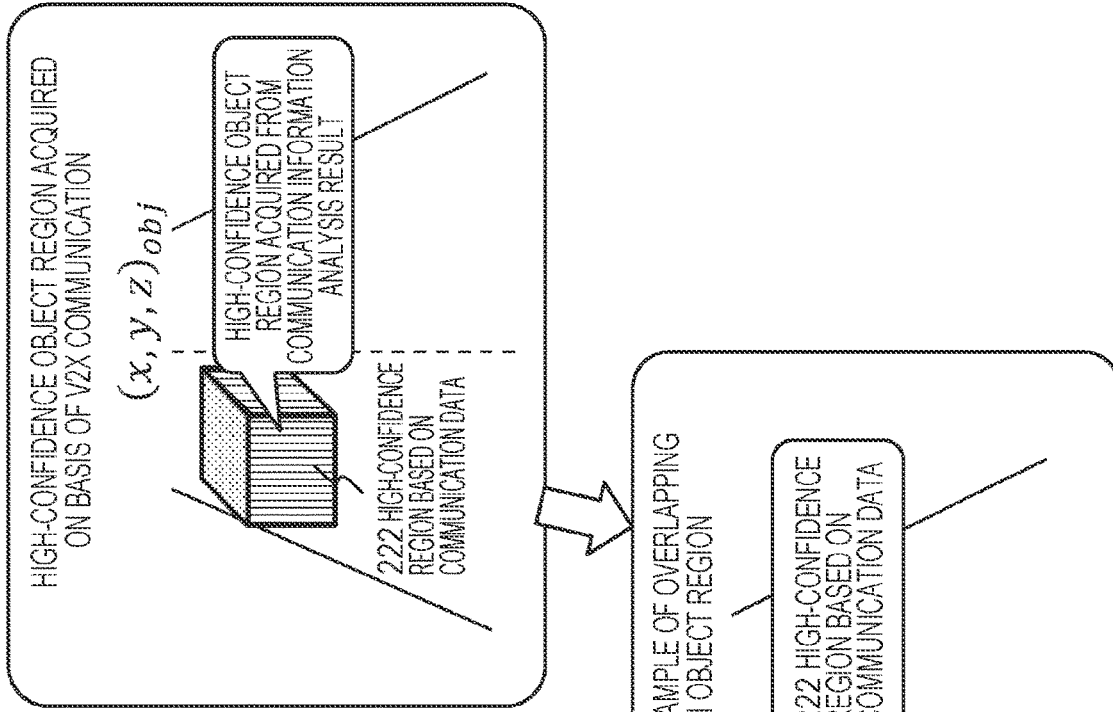
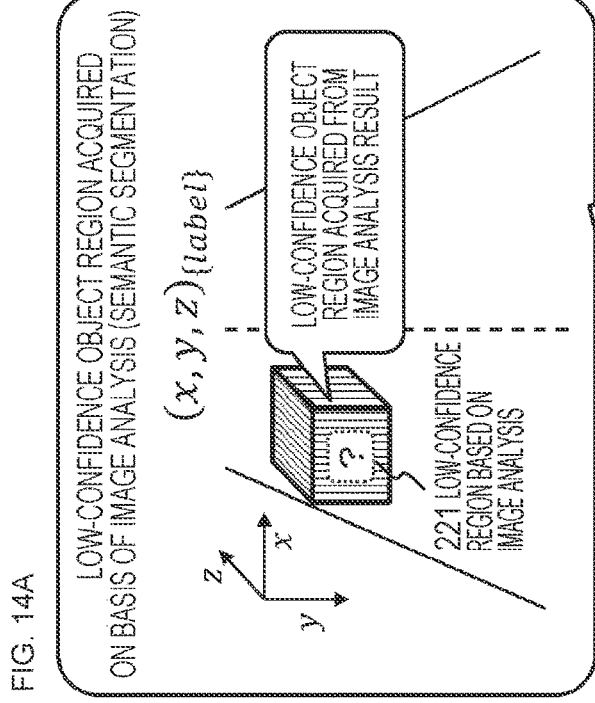

FIG. 16

PROCESSING EXAMPLE IN CASE WHERE UNKNOWN REGION AND LOW-CONFIDENCE REGION ARE OVERLAPPED

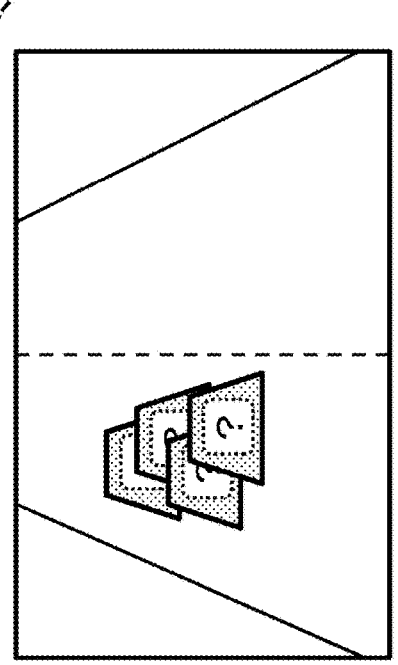

(PROCESSING EXAMPLE 1)
IN CASE WHERE UNKNOWN REGION AND LOW-CONFIDENCE REGION CAN BE SEPARATED IN UNITS OF INDIVIDUAL OBJECT, IoU IS CALCULATED IN INDIVIDUAL REGION IN UNITS OF INDIVIDUAL OBJECT

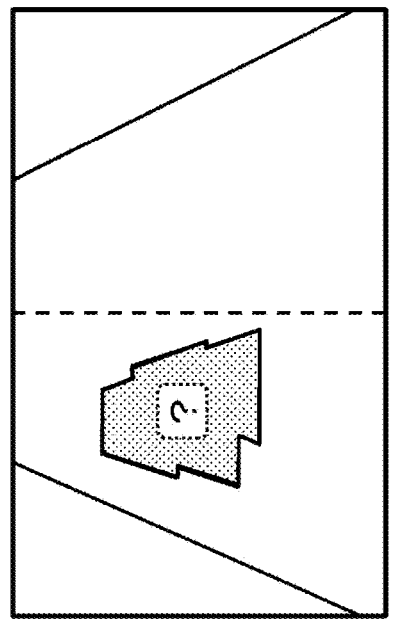

(PROCESSING EXAMPLE 2)
IN CASE WHERE UNKNOWN REGION AND LOW-CONFIDENCE REGION CANNOT BE SEPARATED IN UNITS OF INDIVIDUAL OBJECT, IoU IS CALCULATED IN SINGLE REGION AS SINGLE OBJECT

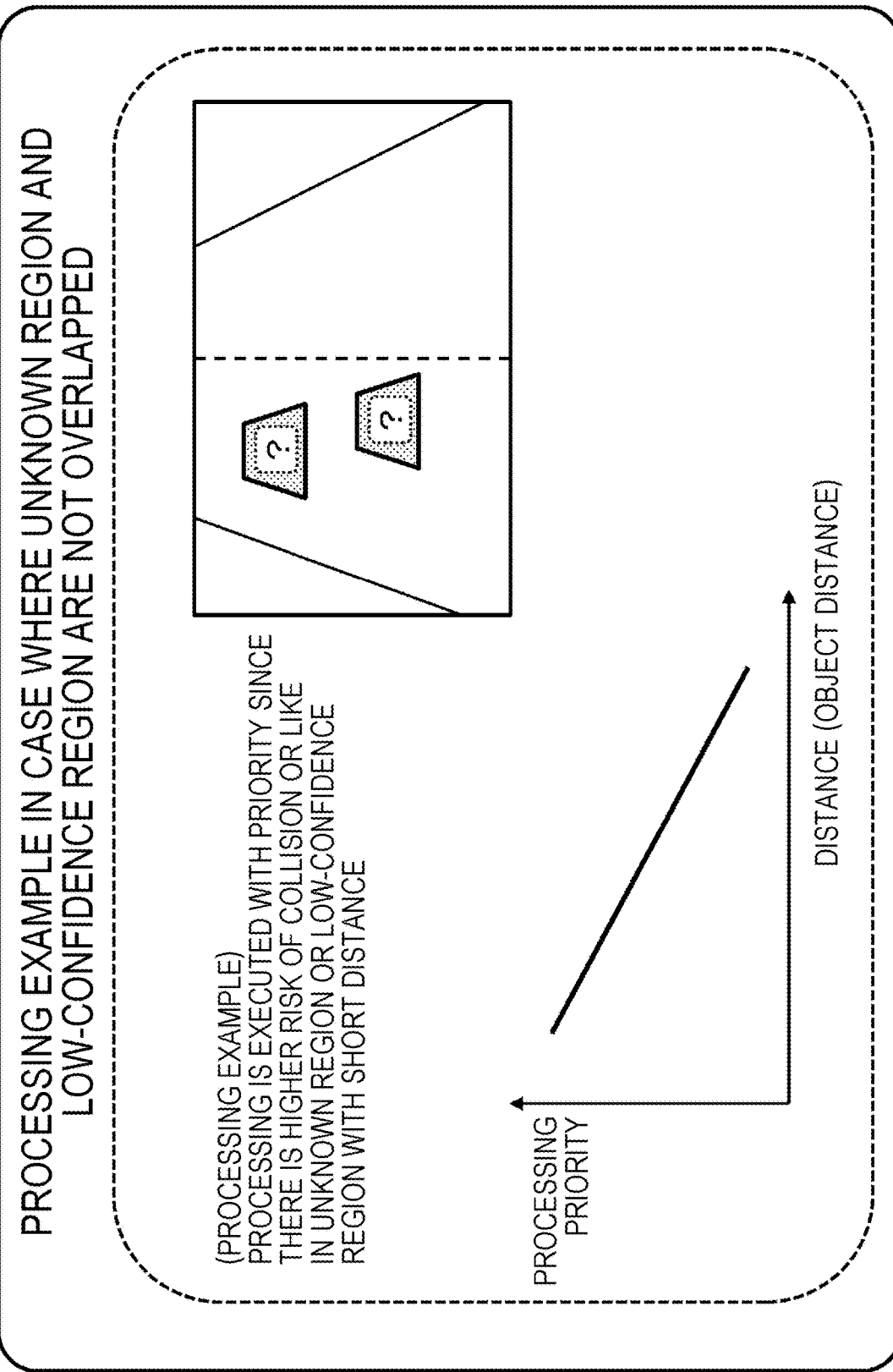

INFORMATION PROCESSING APPARATUS, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2019/041483 filed on Oct. 23, 2019, which claims priority benefit of Japanese Patent Application No. JP 2018-214754 filed in the Japan Patent Office on Nov. 15, 2018. Each of the above-referenced applications is hereby incorporated herein by reference in its entirety.

TECHNICAL FIELD

The present disclosure relates to an information processing apparatus, an information processing system, an information processing method, and a program. More specifically, the present disclosure relates to an information processing apparatus, an information processing system, an information processing method, and a program, for enabling safe traveling of a mobile device such as a vehicle, by executing object identification using analysis information of an image captured by a cameras mounted on the mobile device such as a vehicle and communication information between mobile devices.

BACKGROUND ART

For safe traveling of a vehicle, a technique for detecting and identifying objects (bodies) on a traveling path by analyzing a captured image of a camera provided to the vehicle is being actively developed.

For example, as a technique for identifying an object in a captured image, there is semantic segmentation. The semantic segmentation is a technology for identifying which object category each of constituent pixels (pixels) of an image belongs to, such as a car or a person, on the basis of a matching degree between an object in the image and dictionary data (learned data) for object identification in which various kinds of actual object shape information and other feature information are registered. However, a drawback of this object identification processing is that it becomes difficult or impossible to identify a body having a shape or a feature that is not registered in the dictionary.

Meanwhile, as a conventional technique that discloses a configuration in which an object is identified on the basis of a captured image of a camera and identification confidence is further analyzed, for example, there is Patent Document 1 (Japanese Patent Application Laid-Open No. 2017-215940).

However, regarding the configuration described in Patent Document 1, although there is a description about a configuration for calculating identification confidence, there is no description about handling of objects with low identification confidence, and there is no disclosure of new identification processing for objects with low identification confidence.

CITATION LIST

Patent Document

Patent Document 1: Japanese Patent Application Laid-Open No. 2017-215940

SUMMARY OF THE INVENTION

Problems to be Solved by the Invention

The present disclosure has been made in view of the above-described problems, for example, and an object thereof is to provide an information processing apparatus, an information processing system, an information processing method, and a program, for enabling more reliable object identification to achieve safe traveling of a mobile device, by analyzing a captured image of a camera mounted on the mobile device such as a vehicle and executing object identification using communication information between mobile devices.

Solutions to Problems

A first aspect of the present disclosure is
an information processing apparatus including:
an image analysis unit configured to analyze a captured image of a camera, execute object identification of an image, and set a label as an identification result to an image region;
a low-confidence region extraction unit configured to extract a low-confidence region with low confidence of object identification from an analysis result by the image analysis unit; and
a label updating unit configured to update a label of the low-confidence region on the basis of information received via a communication unit.

Moreover, a second aspect of the present disclosure is an information processing system including a first mobile device and a second mobile device, in which
the first mobile device includes:
a location information acquisition unit configured to acquire location information of the first mobile device; and
a communication unit configured to transmit vehicle information including the location information and a label indicating an object type, and
the second mobile device includes:
an image analysis unit configured to analyze a captured image of a camera mounted on the second mobile device, execute object identification of an image, and set a label as an identification result to an image region;
a low-confidence region extraction unit configured to extract a low-confidence region with low confidence of object identification from an analysis result by the image analysis unit;
a communication unit configured to receive the vehicle information transmitted by the first mobile device; and
a label updating unit configured to update a label of the low-confidence region set by the image analysis unit to a label received from the first mobile device, on the basis of the vehicle information.

Moreover, a third aspect of the present disclosure is an information processing method executed in an information processing apparatus, in which the information processing method is for executing:

an image analysis processing step of, by an image analysis unit, analyzing a captured image of a camera, executing object identification of an image, and setting a label as an identification result to an image region;

a low-confidence region extraction step of, by a low-confidence region extraction unit, extracting a low-confidence region with low confidence of object identification from an analysis result in the image analysis step; and a label updating step of, by a label updating unit, updating a label of the low-confidence region on the basis of information received via a communication unit.

Moreover, a fourth aspect of the present disclosure is an information processing method executed in an information processing system including a first mobile device and a second mobile device, in which the first mobile device acquires location information of the first mobile device, and transmits vehicle information including the location information and a label indicating an object type, and the second mobile device executes:

image analysis processing of analyzing a captured image of a camera mounted on the second mobile device, and setting, to an image region, a label as an object identification result of an image;

low-confidence region extraction processing of extracting a low-confidence region with low confidence of object identification; and label updating processing of updating a label of the low-confidence region set by the image analysis unit to a label received from the first mobile device, on the basis of the vehicle information transmitted by the first mobile device.

Moreover, a fifth aspect of the present disclosure is a program for executing information processing in an information processing apparatus, in which the program is for causing:

an image analysis unit to execute an image analysis processing step of analyzing a captured image of a camera, executing object identification of an image, and setting a label as an identification result to an image region;

a low-confidence region extraction unit to execute a low-confidence region extraction step of extracting a low-confidence region with low confidence of object identification from an analysis result in the image analysis step; and a label updating unit to execute a label updating step of updating a label of the low-confidence region on the basis of information received via a communication unit.

Note that the program of the present disclosure is, for example, a program that can be provided by a storage medium or a communication medium that provides various program codes in a computer-readable format, to an information processing apparatus, image processing apparatus, or a computer system capable of executing the program codes. By providing such a program in a computer-readable format, processing corresponding to the program is realized on the information processing apparatus or the computer system.

Still other objects, features, and advantages of the present disclosure will become apparent from the more detailed description on the basis of the embodiments of the present disclosure as described later and the attached drawings. Note that a system in this specification is a logical set configuration of a plurality of devices, and is not limited to one in which a device of each configuration is in a same casing.

Effects of the Invention

According to a configuration of one embodiment of the present disclosure, a device and a method for enabling safe traveling by performing image analysis and body identification using inter-vehicle communication information is realized.

Specifically, for example, there are provided: an image analysis unit configured to analyze a captured image of a camera mounted on a mobile device, execute object identification of an image, and set a label as an identification result to an image region; a low-confidence region extraction unit configured to extract a region with low confidence of object identification from an image analysis result; and a label updating unit configured to update a label of the low-confidence region on the basis of information received via a communication unit. The label updating unit updates a label in a case where a matching rate between an object region analyzed from information received via the communication unit and the low-confidence region is equal to or greater than a specified threshold.

This configuration makes it possible to realize a device and a method for enabling safe traveling by performing image analysis and body identification using inter-vehicle communication information.

Note that the effects described in this specification are merely examples and are not limited, and additional effects may be present.

BRIEF DESCRIPTION OF DRAWINGS

FIG. 7 is a view for explaining communication information analysis processing and stored data of a communication information analysis result storage unit.

FIG. 8 is a view for explaining a calculation processing example of object location confidence.

FIG. 10 is a view for explaining a calculation processing example of an object overlapping region (IoU).

FIGS. 14A, 14B, and 14C is a are views for explaining processing executed by an overlapping region (IoU) calculation unit.

FIG. 16 is a view illustrating a processing example in a case where an unknown region and a low-confidence region are overlapped.

FIG. 17 is a view illustrating a setting example of priority of processing in a case where an unknown region and a low-confidence region are not overlapped.

MODE FOR CARRYING OUT THE INVENTION

Figure 1:
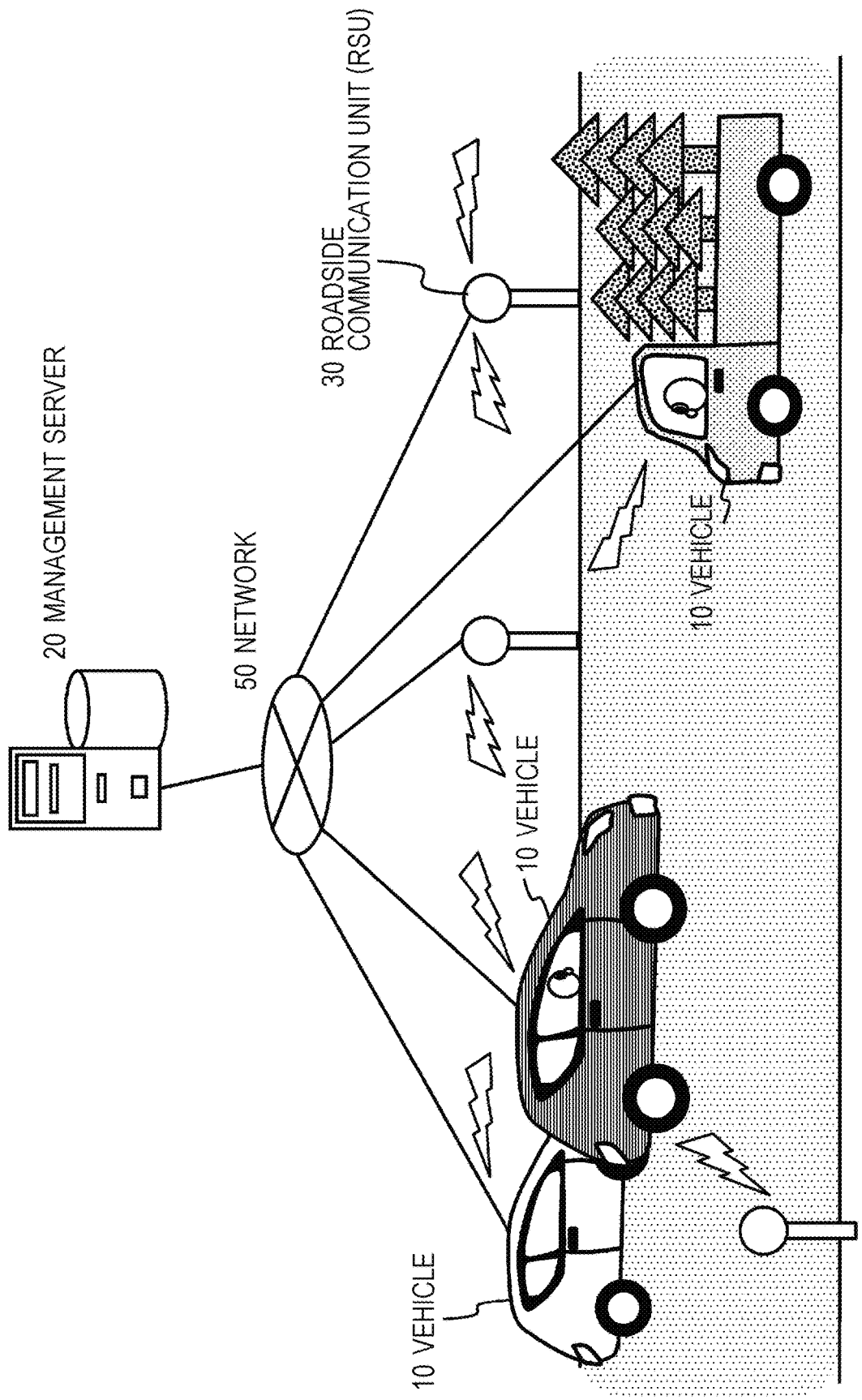
FIG. 1 is a view for explaining an outline of a configuration and processing of the present disclosure.

Hereinafter, with reference to the drawings, an information processing apparatus, an information processing system, an information processing method, and a program of the present disclosure will be described. Note that the description will be made in accordance with the following items.

1. About outline of configuration of present disclosure
2. About example (first embodiment) of configuration and processing of information processing apparatus mounted on vehicle
2-1. About configuration and processing of image acquisition unit (camera) to low-confidence region extraction unit
2-2. About configuration and processing of communication unit (V2X communication) to high-confidence region object projection processing unit
2-3. About configuration and processing of overlapping region ratio (IoU) calculation unit to label updating unit
3. About processing sequence executed by information processing apparatus
4. About embodiment (second embodiment) of generating and using object analysis result based on captured image of image acquisition unit (camera), as three-dimensional information.
5. About processing sequence executed by information processing apparatus
6. About processing in cases where unknown region and low-confidence region are overlapped and are not overlapped
7. About other embodiments
8. About configuration example of information processing apparatus
9. Summary of configuration of present disclosure 1. About Outline of Configuration of Present Disclosure First, an outline of a configuration of the present disclosure will be described with reference to FIG. 1.

In the present disclosure, a camera is mounted on a mobile device such as a vehicle, for example, and a body (an object) on a traveling path is identified by analyzing a captured image of the camera. Moreover, in addition to body identification based on this image, communication is made with another vehicle, or with another roadside communication unit (roadside unit: RSU) and a server, and body identification is performed on the basis of communication information of these. The processing of these realizes reliable (body) object identification, and enables safe traveling of a mobile device such as a vehicle.

Note that, in the following description, a mobile device mounted with an information processing apparatus that executes processing of the present disclosure will be described as a vehicle (an automobile). However, this is one example, and the configuration and the processing of the present disclosure can also be used for various mobile devices other than vehicles, for example, mobile devices such as traveling robots and drones.

With reference to FIG. 1, an outline of a configuration example and processing of the present disclosure will be described.

FIG. 1 shows a plurality of vehicles 10 traveling on a road. The vehicles 10 include a conventional vehicle that travels by driving operation by a driver, and also an automatic driving vehicle that does not require driving operation by a driver.

FIG. 1 shows the vehicle 10, a management server 20, and a roadside communication unit (roadside unit: RSU) 30. These have a configuration enabling mutual communication via a network 50.

Communication between vehicles is called vehicle-to-vehicle communication (V2V communication). Furthermore, communication between a vehicle and an infrastructure facility such as a roadside communication unit (RSU) is called vehicle-to-infrastructure communication (V2I communication). Furthermore, these are collectively called V2X communication. The V2X communication includes vehicle-to-vehicle, vehicle-to-infrastructure facility, vehicle-to-server communication, and the like.

The vehicle 10 shown in FIG. 1 is a vehicle that performs the V2X communication described above.

Each vehicle 10 transmits (multicast-transmits) vehicle information such as own-location information, a vehicle type and a vehicle size, and an identifier (ID), to other vehicles at any time or intermittently.

Note that the own-location information can be acquired by using location information acquired by using GPS, or a dynamic map (DM) provided by the management server 20.

The dynamic map (DM) is a map that reflects, on a map, traffic information that changes sequentially, such as traffic jam information and accident information, for example, in addition to static map information. The management server 20 uses information or the like received from vehicles and infrastructure facilities such as roadside communication units (RSUs), to generate, update, and store, in a storage unit, the dynamic map that prospers latest road conditions.

The dynamic map (DM) generated and updated by the management server 20 is provided to the vehicle 10, and the vehicle 10 can make determination or the like of an own location, a traveling path, and the like on the basis of this map. The automatic driving vehicle can select an optimum route and drive by referring to the dynamic map (DM).

Note that the vehicle 10 is mounted with a camera, and has a configuration of identifying a body (an object) such as an oncoming vehicle on a traveling path and performing control to avoid collision with the body.

Specifically, for example, in a case where the vehicle 10 is an automatic driving vehicle, the vehicle 10 controls a traveling direction and controls of stopping, decelerating, and the like, so as not to collide with the identified body. Furthermore, in a case of a vehicle driven by a driver, warning is made to the driver by displaying a body on a traveling path on a monitor that can be checked by the driver. For example, processing to call attention of the driver is performed by blinking the body display region, outputting an alarm sound, and the like.

2. About Example (First Embodiment) of Configuration and Processing of Information Processing Apparatus Mounted on Vehicle Next, with reference to FIG. 2 and later, a description is given to an example (a first embodiment) of a configuration and processing of an information processing apparatus mounted on a vehicle.

Figure 2:
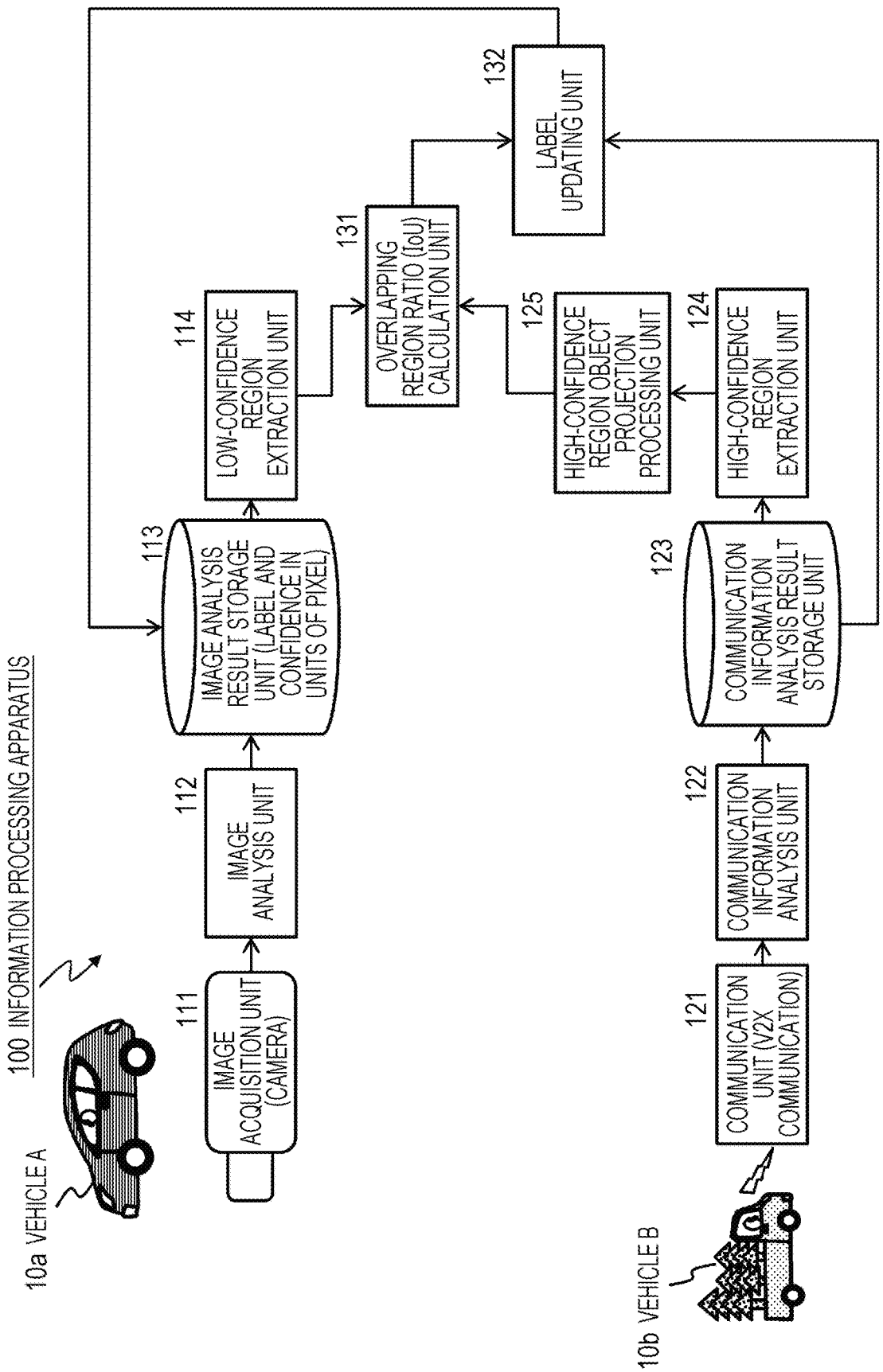
FIG. 2 is a diagram for explaining an example of a configuration and processing of a first embodiment of the present disclosure.

FIG. 2 shows a configuration example of the information processing apparatus mounted on a vehicle A 10a. Note that, in the following, a description is given to a processing example in which the vehicle A 10a and a vehicle B 10b communicate using vehicle-to-vehicle communication (V2V communication) in a situation where the vehicle A 10a on the left side shown in FIG. 2 is approaching the vehicle B 10b on the right side shown in FIG. 2 during traveling.

A configuration and processing of an information processing apparatus 100 mounted on the vehicle A 10a will be sequentially described in units of the following three components.

(1) Configuration and processing of image acquisition unit (camera) 111 to low-confidence region extraction unit 114
(2) Configuration and processing of communication unit (V2X communication) 121 to high-confidence region object projection processing unit 125
(3) Configuration and processing of overlapping region ratio (IoU) calculation unit 131 to label updating unit 132

2-1. Configuration and Processing of Image Acquisition Unit (Camera) to Low-Confidence Region Extraction Unit First, a configuration and processing of an image acquisition unit (a camera) 111, an image analysis unit 112, an image analysis result storage unit 113, and a low-confidence region extraction unit 114 of the information processing apparatus 100 shown in FIG. 2 will be described.

The vehicle A 10a has the image acquisition unit (the camera) 111, and for example, captures an image in a traveling direction. The captured image is inputted to the image analysis unit 112.

The image analysis unit 112 analyzes the captured image of the image acquisition unit (the camera) 111 and performs identification processing of a body (an object) in the image. That is, body identification (object identification) is executed as to what the body being captured in each image region of the captured image is.

The body identification (object identification) processing executed by the image analysis unit 112 is executed by applying an existing method, for example, a method such as pattern matching or semantic segmentation.

The pattern matching is processing of, for example, storing pattern data including a shape and feature information of a person, a car, or the like in a storage unit, and identifying each subject by comparing the pattern data stored in the storage unit with a subject in an image region on the captured image.

The semantic segmentation is a technique of storing dictionary data (learned data) for object identification based on various kinds of actual object shape and other feature information in the storage unit, and performing object identification as to what the object in the image is, on the basis of a matching degree between the dictionary data and the object in the captured image. In the semantic segmentation, body identification is performed in units of pixel of the captured image.

Figure 3:
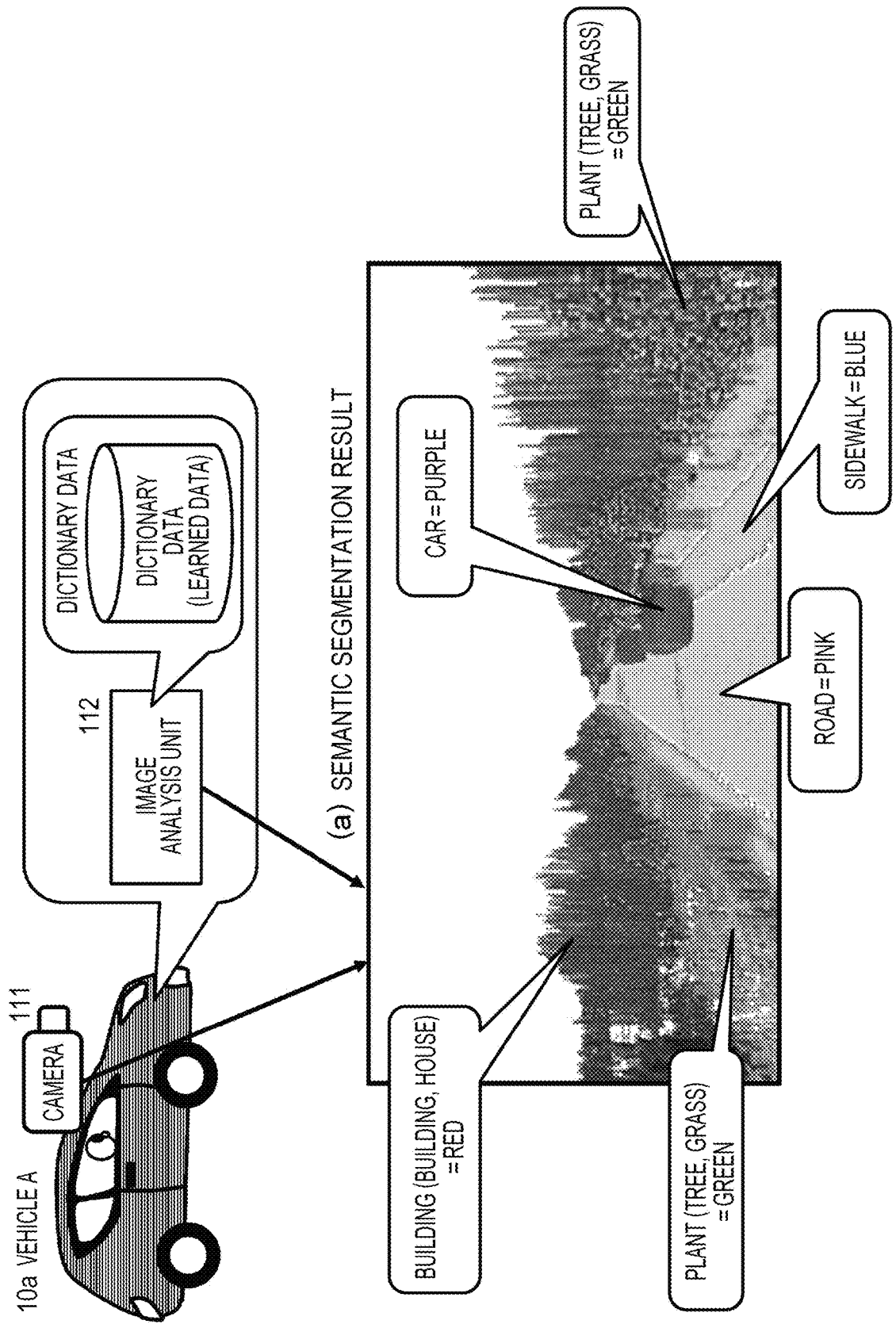
FIG. 3 is a view for explaining semantic segmentation.

With reference to FIG. 3 and later, an outline of the semantic segmentation will be described. FIG. 3 shows an example of a result of the semantic segmentation on an image captured by the image acquisition unit (the camera) 111 provided in the vehicle 10a. Note that, although an image shown in the figure is shown as a black-and-white image, it is actually a color image.

The image analysis unit 112 refers to dictionary data (learned data) for object identification based on various kinds of actual object shape and other feature information, and performs object identification in units of pixel of the captured image.

The image analysis unit 112 performs processing of setting a label indicating what kind of object each pixel in the image belongs to, in units of pixel, on the basis of a matching degree between dictionary data and an object in the image. As a result of this, a color-coded image is generated in accordance with a label (an object type) in units of pixel as shown in FIG. 3.

The image shown in FIG. 3 is color-coded in accordance with the following labels (object types).

Label=building (building, house)=red
Label=car=purple
Label=plant (tree, grass)=green
Label=road=pink
Label=sidewalk=blue These are results of color coding according to a label (an object type) identified on the basis of the dictionary data.

For example, an automatic driving vehicle enables safe traveling by using such object identification results to perform driving control, to avoid objects that may collide in the traveling direction.

As described above, the image analysis unit 112 performs body identification processing using an existing technique such as semantic segmentation or pattern matching.

Moreover, together with a body identification result, the image analysis unit 112 generates label confidence indicating confidence of the body identification result.

The label confidence is a score indicating confidence of a label set in units of constituent pixel of a captured image, that is, body identification confidence in units of pixel.

Figure 4:
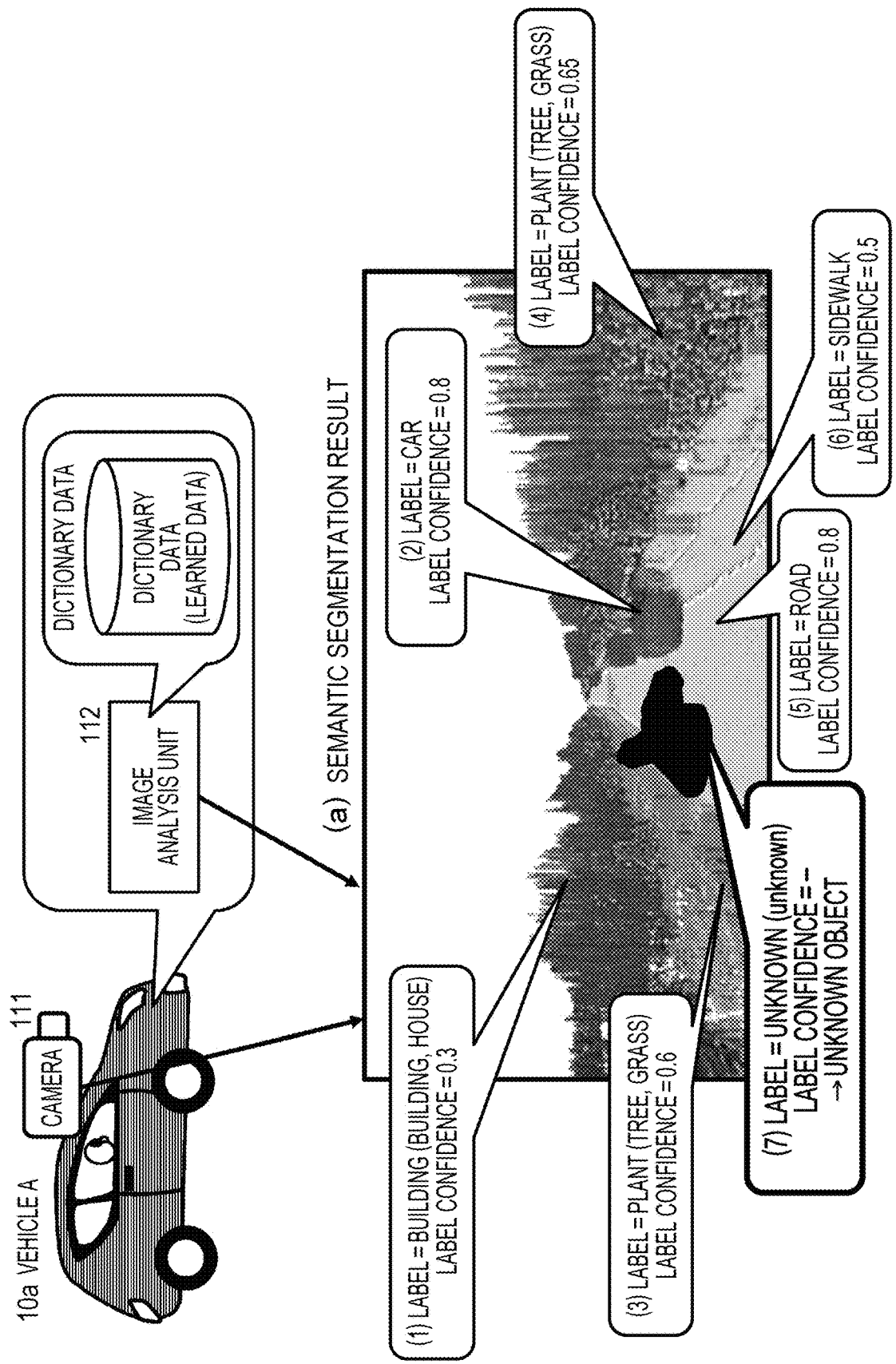
FIG. 4 is a view for explaining semantic segmentation and label confidence.

FIG. 4 shows a data example in which label confidence (object identification confidence) is associated with the label (the object type) in units of pixel, which is a result of semantic segmentation processing.

The example shown in FIG. 4 is an example in which label confidence of label confidence=0 to 1 is set, where minimum confidence of the label confidence is 0 and maximum confidence is 1.

In the example shown in the figure, the following label confidence is set corresponding to each identified body.
(1) Label=building (building, house), label confidence=0.3,
(2) Label=car, label confidence=0.8,
(3) Label=plant (tree, grass), label confidence=0.6,
(4) Label=plant (tree, grass), label confidence=0.65,
(5) Label=road, label confidence=0.8,
(6) Label=sidewalk, label confidence=0.5, and
(7) Label=unknown, label confidence=—(no setting)→unknown body (unknown object).

When the label confidence is high, it can be estimated that the label, that is, the object identification result is correct. However, when the label confidence is low, the identification result is low confidence, and the object identification result may not be used as it is.

For example, (7) Label=unknown, label confidence=—(no setting)→unknown body (unknown object)

the label with this identification result is unknown. This is a label to be set in a case where the object cannot be specified, such as a case where the object in the image region detected from the image is an object that is not registered in learning data used for object identification.

In a case where the label is unknown, label confidence is not to be set. This region is determined to be an unknown body (unknown object) region.

Note that, a configuration may be adopted in which the label confidence is set even in a case where the label is unknown. For example, in a case where there is a high possibility that the region set with the unknown label is really the unknown region, the label confidence is set to high confidence. Whereas, in a case where there is a low possibility that the region is unknown, the label confidence is set to low confidence.

Note that, while FIG. 4 shows an application example of semantic segmentation, the image analysis unit 112 may have a configuration for performing body identification from an image captured by the camera by using other methods, for example, various methods such as pattern matching, without limiting to semantic segmentation. However, even in a case where other methods are applied, the label that is a result of body identification and the label confidence corresponding to each identification result are also generated.

Note that the label and the label confidence are set in units of pixel of the image.

As shown in FIG. 2, the label (the body identification result) generated by the image analysis unit 112 and the label confidence are stored in the image analysis result storage unit 113.

Figure 5:
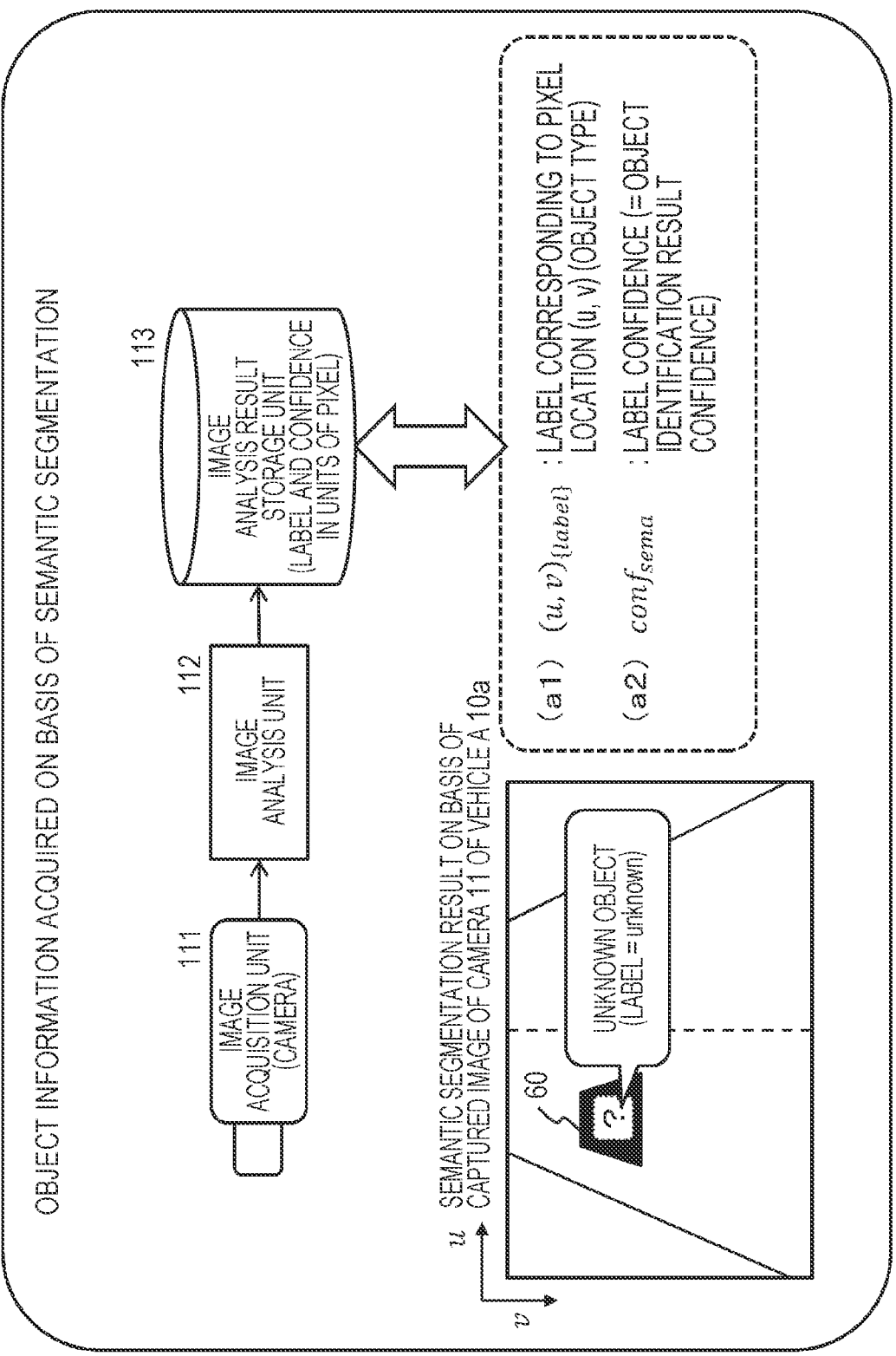
FIG. 5 is a view for explaining image analysis processing and stored data in an image analysis result storage unit.

With reference to FIG. 5, an example of data stored in the image analysis result storage unit 113 will be described. As shown in FIG. 5, the image analysis result storage unit 113 stores the following data generated by the image analysis unit 112.

(a1) $(u, v)_{\{label\}}$: a label corresponding to a pixel location $(u, v)$ (object type=body identification result), and (a2) $conf_{sema}$: a label confidence (object identification result confidence).

The image analysis unit 112 generates these data in units of pixel of the image, and stores in the image analysis result storage unit 113.

The color-coded data for each label that is set for each pixel corresponds to the image described with reference to FIGS. 3 and 4.

Note that, as described above, some regions in the image include regions in which object identification based on learning data is not possible. A label of such a region is set as label=unknown (unknown region) and confidence is not to be set for this region.

For example, an image region 60 of an image shown in the lower left of FIG. 5 is an image region set as label=unknown (unknown region).

Next, with reference to FIG. 6, processing executed by the low-confidence region extraction unit 114 shown in FIG. 2 will be described.

The low-confidence region extraction unit 114 uses an image analysis result stored in the image analysis result storage unit 113, to extract a region whose object identification result is low confidence from a captured image of the image acquisition unit (the camera) 111.

Specifically, (1) a region set as label=unknown (unknown region), and (2) a region where the label confidence is less than a specified threshold value (Th1), these two types of regions are extracted as "low-confidence regions".

Figure 6:
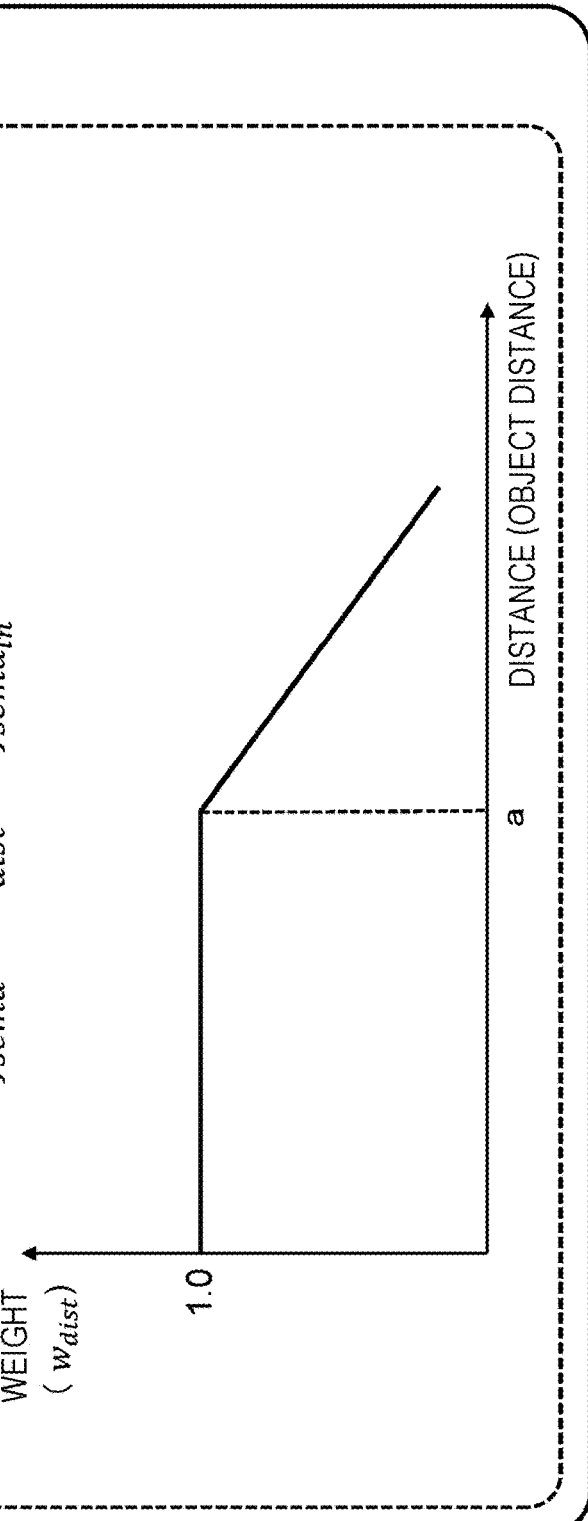
FIG. 6 is a view for explaining a calculation processing example of label confidence.

Note that in a case where the region of (2) described above is selected, that is, (2) a region where the label confidence is less than the specified threshold value (Th1), this region is selected, the label confidence ($conf_{sema}$) to be compared with the threshold value (Th1) is calculated in accordance with one of processing examples (Processing example 1) and (Processing example 2) shown in FIG. 6.

(Processing example 1) is a processing example in which the label confidence stored in the image analysis result storage unit 113 is used as it is.

(Processing example 2) is a processing example in which new label confidence is calculated by multiplying the label confidence stored in the image analysis result storage unit 113 by a weight ($w_{dist}$) according to an object distance (a distance from the camera) of the image region, and the calculated label confidence is used.

The label confidence stored in the image analysis result storage unit 113 is defined as $conf_{semain}$.

In (Processing example 1), the label confidence ($conf_{semain}$) stored in the image analysis result storage unit 113 is to be label confidence ($conf_{sema}$) as it is, which is applied to low-confidence region discrimination processing based on comparison with the specified threshold value (Th1). That is, $conf_{sema} = conf_{semain} < Th1$   (Determination formula 1a)

a region satisfying the above-described (Determination formula 1a) is defined as the low-confidence region.

In addition, (Processing example 2) is a processing example in which new label confidence is calculated by multiplying the label confidence ($conf_{semain}$) stored in the image analysis result storage unit 113 by a weight ($w_{dist}$) according to an object distance (a distance from the camera) of the image region, and the calculated label confidence is used. That is, $conf_{sema} = (w_{dist} \times conf_{semain}) < Th1$   (Determination formula 1b)

a region satisfying the above-described (Determination formula 1b) is defined as the low-confidence region.

Note that, as shown in FIG. 6 (Processing example 2), the weight ($w_{dist}$) is set to be constant (weight ($w_{dist}$)=1) until the object distance (the distance from the camera) reaches a specified distance (distance a), and set to a value of 1 or less in accordance with the distance after the object distance (the distance from the camera) exceeds the specified distance (distance a).

In this way, adjustment is made such that the confidence is further reduced for objects that are far away. That is, for objects at long distances, the value of (waist×$conf_{semain}$) is smaller and adjusted to a value in which label confidence ($conf_{semain}$) obtained by the original image analysis is reduced. By comparison processing between this adjustment value and the threshold value (Th1) described above, it is determined whether or not to be the "low-confidence region".

This processing increases the possibility that an object far from the camera will be determined to be the "low-confidence region".

This is processing corresponding to decrease in object identification accuracy for distant objects in the image captured by the camera.

The low-confidence region extraction unit 114 executes (Processing example 1) or (Processing example 2) described above to extract the low-confidence region.

Note that, in addition to the region extracted by determination processing based on the above-described threshold value (Th1), the region set as label=unknown (unknown region) is also extracted as the "low-confidence region".

In this way, the low-confidence region extraction unit 114 uses the image analysis result stored in the image analysis result storage unit 113 to extract the "low-confidence region" whose object identification result is low confidence, from the captured image of the image acquisition unit (the camera) 111. The extracted "low-confidence region" information is inputted to an overlapping region ratio (IoU) calculation unit 131.

2-2. About Configuration and Processing of Communication Unit (V2X Communication) to High-Confidence Region Object Projection Processing Unit Next, a description is given to a configuration and processing of a communication unit (V2X communication) 121, a communication information analysis unit 122, a communication information analysis result storage unit 123, a high-confidence region extraction unit 124, and a high-confidence region object projection processing unit 125 of the information processing apparatus 100 shown in FIG. 2.

First, with reference to FIG. 7, a description will be given to a configuration and processing of the communication unit (V2X communication) 121, the communication information analysis unit 122, and the communication information analysis result storage unit 123.

The communication unit (V2X communication) 121 executes vehicle-to-vehicle communication (V2V communication) with surrounding vehicles of the own vehicle, and communication with infrastructure such as a surrounding roadside communication unit (RSU) and the management server 20.

The communication unit (V2X communication) 121 receives vehicle information including location information of each vehicle from surrounding vehicles by vehicle-to-vehicle communication (V2V communication) with the surrounding vehicles.

The received information of the communication unit (V2X communication) 121 is inputted to the communication information analysis unit 122, and analysis result data by the communication information analysis unit 122 is stored in the communication information analysis result storage unit 123.

With reference to FIG. 7, data stored in the communication information analysis result storage unit 123 will be described. As shown in FIG. 7, the data stored in the communication information analysis result storage unit 123 as an analysis result by the communication information analysis unit 122 includes, for example, each of the following data.

(b1) $(x, y, z)_{obj}$: three-dimensional location information (GPS location) of an object,
(b2) $Sens_{obj}$: GPS reception sensitivity information,
(b3) $conf_{obj}$: confidence information of an own location $(x, y, z)_{obj}$,
(b4) $label_{obj}$: an object label (object type information),
(b5) $(w, h, d)_{obj}$, or $polygon_{obj}$: object shape and size information, and
(b6) $(Pitch, Yaw, Roll)_{obj}$: an object position (a pitch, a yaw, a roll) information.

Note that the object shown in (b1) to (b6) is a communication partner of V2X communication, specifically, a vehicle of the communication partner, for example, the vehicle B 10b in the lower left of FIG. 7. The vehicle B 10b corresponds to an object of a region determined to be an unknown object in the low-confidence region, such as an unknown region in the semantic segmentation in the image analysis unit 112.

For example, the vehicle B 10b in the lower left of FIG. 7 multicast-transmits the above-described information (b1) to (b6) as vehicle information via the communication unit.

The vehicle A 10a receives the multicast transmission data transmitted by the vehicle B 10b via the communication unit (V2X communication) 121, and the communication information analysis unit 122 stores this data in the communication information analysis result storage unit 123.

However, not all of the above-described information (b1) to (b6) shown in FIG. 7 can be received from the communication partner of V2X communication.

For example, there is also a case of setting where only the three-dimensional location information $(x, y, z)_{obj}$ of the object is received.

In this case, only the received information, that is, the three-dimensional location information $(x, y, z)_{obj}$ of the object is stored in the communication information analysis result storage unit 123.

Next, with reference to FIG. 8, processing executed by the high-confidence region extraction unit 124 will be described.

The high-confidence region extraction unit 124 extracts a high-confidence region (a high confidence object) in which confidence of three-dimensional location information $(x, y, z)_{obj}$ of an object received from a communication partner of the V2X communication, specifically, a vehicle of the communication partner, for example, the vehicle B 10b in the lower left figure of FIG. 7, is larger than a specified threshold value (Th2).

Note that the confidence of the three-dimensional location information $(x, y, z)_{obj}$ of the object received from the vehicle of the communication partner is calculated in accordance with one of Processing examples 1 and 2 shown in FIG. 8.

(Processing example 1) is processing in which confidence information $conf_{obj}$ of an own location $(x, y, z)_{obj}$ received from a communication partner of V2X communication is used as it is.

The communication partner of V2X communication performs own-location calculation using GPS, for example, and transmits own-location information $(x, y, z)_{obj}$ as a calculation result. Moreover, in the own-location calculation processing, confidence information $conf_{obj}$ indicating confidence of the calculated own-location information $(x, y, z)_{obj}$ is also calculated and multicast-transmitted. In this case, this received information can be used as it is.

Note that the confidence information $conf_{obj}$ has a value in a range of 0 to 1, for example, where low confidence=0 to high confidence=1.

Whereas, (Processing example 2) is a processing example that can be used in a case where, for example, the confidence information $conf_{obj}$ cannot be received from the communication partner of V2X communication.

The communication partner of V2X communication performs own-location calculation using GPS, for example, and transmits own-location information $(x, y, z)_{obj}$ as a calculation result. Moreover, the GPS reception sensitivity information $Sens_{obj}$ used in the own-location calculation processing is transmitted.

In this case, the high-confidence region extraction unit 124 uses the reception sensitivity information $Sens_{obj}$ to calculate confidence $conf_{obj}$, which indicates confidence of the own-location information $(x, y, z)_{obj}$ received from the communication partner of V2X communication.

For example, confidence information $conf_{obj}$ is calculated from reception sensitivity information $Sens_{obj}$ by using a function (a graph) shown in FIG. 8.

The function (the graph) shown in FIG. 8 is a specified function stored in advance in an available memory of the high-confidence region extraction unit 124.

The function (the graph) shown in FIG. 8 has a setting in which confidence of $conf_{obj}=1$ (max) is satisfied in a case where the reception sensitivity $Sens_{obj}$ is equal to or higher than a specified value (a), and there is a change in a range of confidence $conf_{obj}=0$ to 1 in proportion to a value of reception sensitivity $Sens_{obj}$ in a case where the reception sensitivity $Sens_{obj}$ is 0 to the specified value (a).

That is, in a case where the reception sensitivity $Sens_{obj}$ is low, the confidence calculation is performed to lower the confidence $conf_{obj}$ of the own-location information $(x, y, z)_{obj}$ received from the communication partner of V2X communication.

The high-confidence region extraction unit 124 executes either the processing of (Processing example 1) or (Processing example 2) shown in FIG. 8, to acquire or calculate the confidence $conf_{obj}$ of own-location information (x, y, received from the communication partner of V2X communication.

Moreover, the acquired or calculated confidence $conf_{obj}$ is compared with the predetermined threshold value (Th2). That is, confidence $conf_{obj}>Th2$            (Determination formula 2)

a region (an object) satisfying the above-described Determination formula 2 is extracted as the "high-confidence region".

In this way, the high-confidence region extraction unit 124 uses an analysis result of V2X communication information stored in the communication information analysis result storage unit 123, to extract the own-location information $(x, y, z)_{obj}$, that is, the "high-confidence region" in which the object location has high confidence, from the communication information received by the communication unit 121. The extracted "high-confidence region" information is inputted to the high-confidence region object projection processing unit 125.

The high-confidence region object projection processing unit 125 projects the object region with high confidence extracted by the high-confidence region extraction unit 124, onto a two-dimensional image plane captured by the image acquisition unit (the camera) 111.

The object region with high confidence extracted by the high-confidence region extraction unit 124 is three-dimensional space region information that is occupied by an object and based on an object location and size received from the communication partner. The high-confidence region object projection processing unit 125 executes projection conversion processing of the three-dimensional space region occupied by the object, to generate a projection image $(u, v)_{obj}$ projected on the two-dimensional image plane captured by the image acquisition unit (the camera) 111.

The calculation processing of the projection image $(u, v)_{obj}$ is performed by an operation using a projection matrix $P_{4\times3}$ of the image acquisition unit (the camera) 111 stored in advance in an accessible memory of the high-confidence region object projection processing unit 125.

The projection image $(u, v)_{obj}$ of the object in the high-confidence region generated by the high-confidence region object projection processing unit 125 is inputted to the overlapping region ratio (IoU) calculation unit 131.

2-3. About Configuration and Processing of Overlapping Region Ratio (IoU) Calculation Unit to Label Updating Unit Next, a description is given to a configuration and processing of the overlapping region ratio (IoU) calculation unit 131 and a label updating unit 132 of the information processing apparatus 100 shown in FIG. 2.

First, with reference to FIGS. 9A, 9B, and 9C, processing executed by the overlapping region ratio (IoU) calculation unit 131 will be described.

Figure 9B:
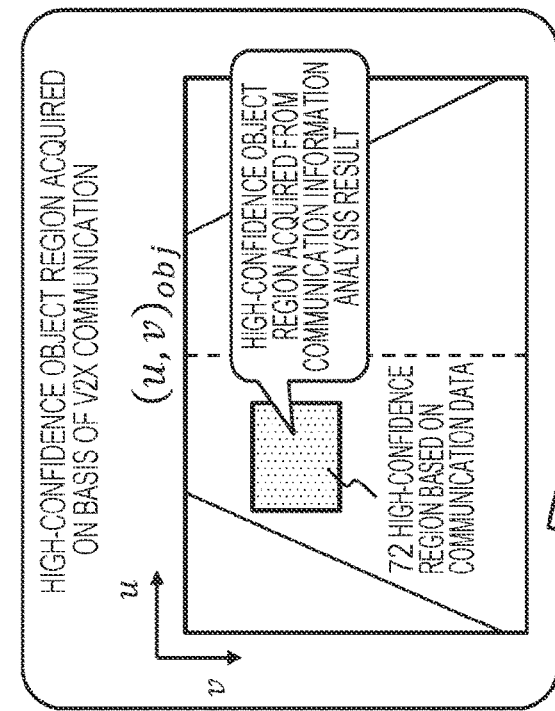
FIGS. 9A, 9B, and 9C are views for explaining processing executed by an overlapping region (IoU) calculation unit.
Figure 9A:
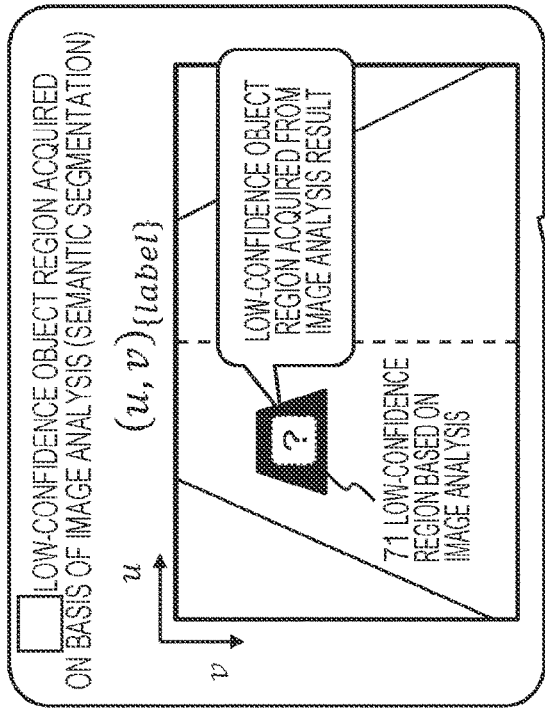
Figure 9C:
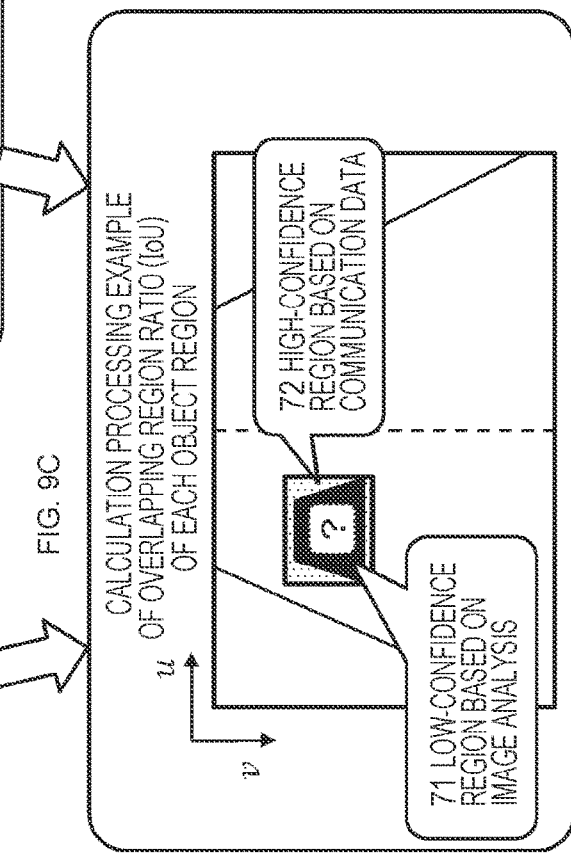

FIGS. 9A, 9B, and 9C shows each of the following figures.

FIG. 9A: Low-confidence object region acquired on the basis of image analysis (semantic segmentation)

FIG. 9B: High-confidence object region acquired on the basis of V2X communication FIG. 9C: Calculation processing example of overlapping region ratio (IoU) of each object region FIG. 9A shows a low-confidence region extracted by the low-confidence region extraction unit 114 of the information processing apparatus 100 shown in FIG. 2, that is, a low-confidence region extracted on the basis of a result of image analysis such as semantic segmentation.

As described above with reference to FIGS. 5 and 6, by the low-confidence region extraction unit 114 of the information processing apparatus 100, (1) a region set as label=unknown (unknown region), and
(2) a region where the label confidence is less than a specified threshold value (Th1),
these two types of regions are extracted as "low-confidence regions".

A region 71 in the image shown in FIG. 9A is a "low-confidence region 71 based on image analysis".

Whereas, FIG. 9B shows a high-confidence region extracted by the high-confidence region extraction unit 124 of the information processing apparatus 100 shown in FIG. 2, that is, a high-confidence region extracted on the basis of an analysis result of communication information received from a communication partner of V2X communication. Note that a rectangular region 72 shown in FIG. 9B, that is, a "high-confidence region 72 based on communication data" is a region of a projection image (u, v)obj obtained by projecting the high-confidence region extracted by the high-confidence region extraction unit 124 onto an image plane. This projection image is an image generated by the high-confidence region object projection processing unit 125.

The overlapping region ratio (IoU) calculation unit 131 inputs the "low-confidence region 71 based on image analysis" information shown in FIG. 9A from the low-confidence region extraction unit 114 of the information processing apparatus 100 shown in FIG. 2.

Moreover, from the high-confidence region object projection processing unit 125 of the information processing apparatus 100 shown in FIG. 2, the "high-confidence region 72 based on communication data" information shown in FIG. 9B is inputted.

The overlapping region ratio (IoU) calculation unit 131 inputs these two pieces of object region information, and superimposes the two object regions on one image as shown in FIG. 9C.

The overlapping region ratio (IoU) calculation unit 131 uses the superimposed image of these two object regions, to calculate an overlapping region ratio (intersection of union: IoU) of each object region.

With reference to FIG. 10, a specific example of the overlapping region ratio (intersection of union:IoU) calculation processing will be described.

The overlapping region ratio (IoU) is calculated by the following calculation formula as shown in FIG. 10.

Overlapping region ratio (IoU)=(overlapping region (Area of Overlap)/entire region (Area of Union))

The overlapping region (Area of Overlap) is an area of an overlapping portion of two object regions.

The entire region (Area of Union) is an entire area of two object regions.

For example, overlapping region ratio (IoU)=1 indicates overlapping region (Area of Overlap)=entire region (Area of Union), which means that the two object regions are completely overlapped.

For example, overlapping region ratio (IoU)=0.5 indicates that the overlapping region (Area of Overlap) is ½ of the entire region (Area of Union), which means that 50% of the two object regions are overlapped.

For example, overlapping region ratio (IoU)=0 means that there is no overlapping region (Area of Overlap), which means that the two object regions do not overlap at all.

In this way, the overlapping region ratio (IoU) is a value indicating an overlapping ratio of two object regions.

As shown in FIGS. 9A, 9B, and 9C, the overlapping region ratio (IoU) calculation unit 131 calculates the overlapping region ratio (IoU) of the "low-confidence region 71 based on image analysis" shown in FIG. 9A and the "high-confidence region 72 based on communication data" shown in FIG. 9B.

The overlapping region ratio (IoU) calculated by the overlapping region ratio (IoU) calculation unit 131 is inputted to the label updating unit 132 of the information processing apparatus 100 shown in FIG. 2.

The label updating unit 132 compares the overlapping region ratio (IoU) calculated by the overlapping region ratio (IoU) calculation unit 131 with a predetermined threshold value (Th3). That is, with the following Determination formula 3, overlapping region ratio (IoU)≥Th3  (Determination formula 3), an object region that satisfies the Determination formula 3 described above is selected.

Moreover, for the object region satisfying the above-described Determination formula 3, the label updating unit 132 acquires a label included in vehicle information received by the communication unit 121 from a communication partner object, that is, the label that has been described with reference to FIG. 7, (b4) $label_{obj}$: an object label (object type information), from the communication information analysis result storage unit 123.

The label updating unit 132 executes label updating processing of setting a label indicating an object type acquired from the communication information analysis result storage unit 123, as a label of the image analysis result storage unit 113.

This processing makes it possible to set a high-confidence label (object type information) obtained by V2X communication, for regions that are determined to be unknown objects of low-confidence regions, such as unknown regions (Unknown), in image analysis such as semantic segmentation.

That is, for regions where object identification is difficult and low confidence labels are set in image analysis, it becomes possible to set a label of high confidence acquired on the basis of V2X communication, and it becomes possible to reduce unknown regions and the low-confidence regions in an image captured by the camera. As a result, safe traveling of a vehicle is realized.

3. About Processing Sequence Executed by Information Processing Apparatus

Figure 11:
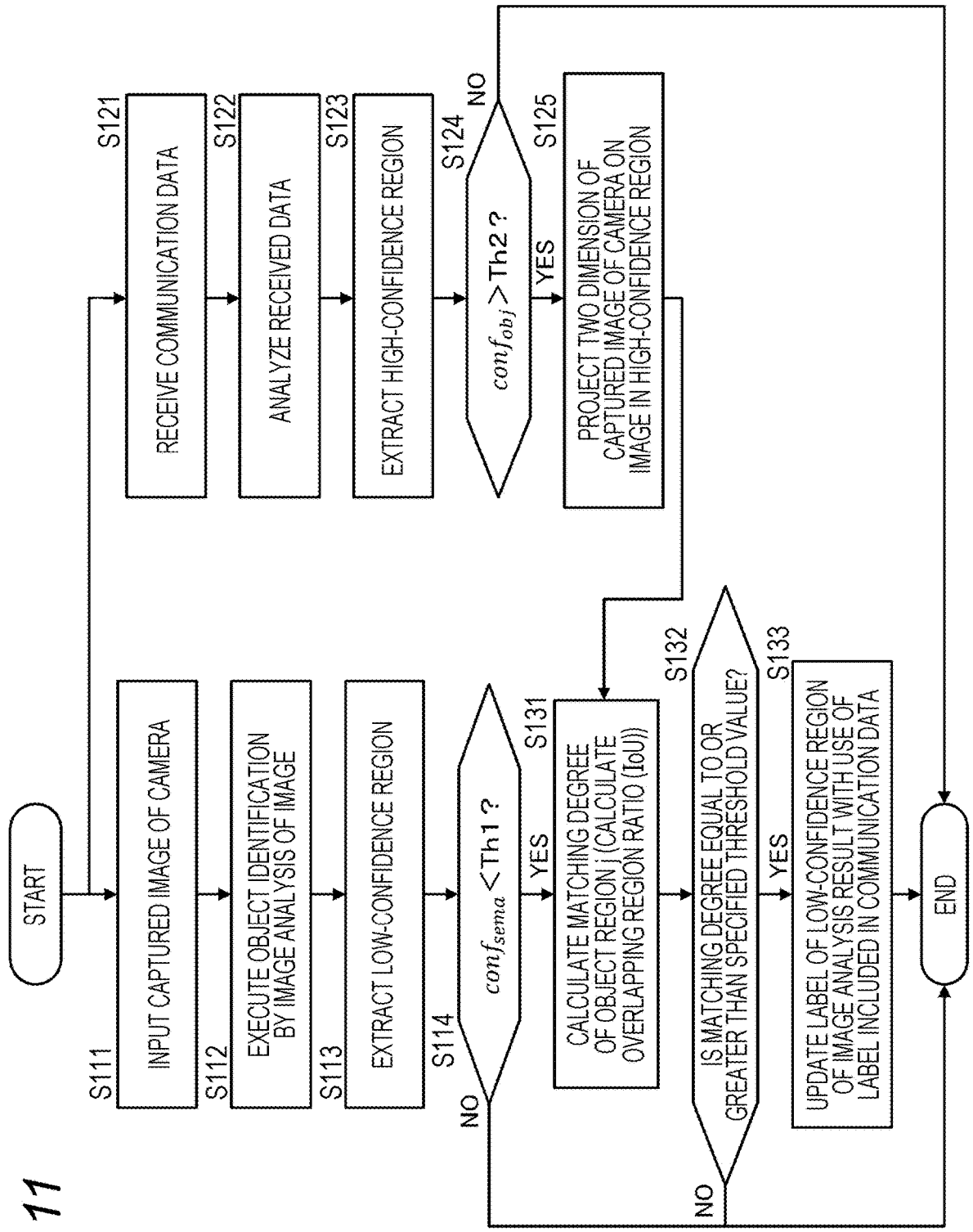
FIG. 11 is a view showing a flowchart for explaining a sequence of processing executed by an information processing apparatus mounted on a vehicle.

Next, with reference to a flowchart shown in FIG. 11, a description is given to a processing sequence executed by the information processing apparatus 100 shown in FIG. 2.

Processing according to the flowchart shown in FIG. 11 can be executed in accordance with, for example, a program stored in a storage unit of the information processing apparatus 100.

Hereinafter, processing of each step of the flowchart will be described.

(Step S111)

First, processing of steps S111 to S114 will be described.

The processing of steps S111 to S114 is processing executed by the image acquisition unit (the camera) 111 to the low-confidence region extraction unit 114 of the information processing apparatus 100 shown in FIG. 2. That is, it is object analysis processing using a captured image of the image acquisition unit (the camera) 111.

Whereas, processing of steps S121 to S125 is processing executed by the communication unit (V2X communication) 121 to the high-confidence region object projection processing unit 125 of the information processing apparatus 100 shown in FIG. 2. That is, it is object analysis processing using received data of the communication unit (V2X communication) 121.

Note that, the processing of steps S111 to S114 and the processing of steps S121 to S125 are processing that can be executed independently in parallel.

First, the processing of steps S111 to S114 will be described.

The information processing apparatus 100 acquires a captured image in step S111.

This processing is processing executed by the image acquisition unit (the camera) 111 of the information processing apparatus 100 shown in FIG. 2. The image acquisition unit (the camera) 111 captures an image of a vehicle, for example, in a traveling direction.

The captured image of the image acquisition unit (the camera) 111 is inputted to the image analysis unit 112.

(Step S112)

Next, in step S112, image analysis processing of the captured image of the image acquisition unit (the camera) 111 is executed.

This processing is processing executed by the image analysis unit 112.

The image analysis unit 112 inputs the captured image of the image acquisition unit (the camera) 111, and executes identification processing of a body included in the captured image. For example, as described above, body identification is performed using an existing technique such as pattern matching or semantic segmentation.

The image analysis unit 112 generates pair data of a "label (a body identification result)", which is a result of the body identification processing, and "label confidence" indicating confidence of the label in units of pixel.

The generated data is stored in the image analysis result storage unit 113 shown in FIG. 2.

(Steps S113 to S114)

Next, in steps S113 to S114, low-confidence region extraction processing is executed using the "label (the body identification result)" and the "label confidence" stored in the image analysis result storage unit 113.

This processing is processing executed by the low-confidence region extraction unit 114 shown in FIG. 2.

The low-confidence region extraction unit 114 uses an image analysis result stored in the image analysis result storage unit 113, to extract a region whose object identification result is low confidence from a captured image of the image acquisition unit (the camera) 111.

Specifically, (1) a region set as label=unknown (unknown region), and (2) a region where the label confidence is less than a specified threshold value (Th1), these two types of regions are extracted as "low-confidence regions".

Note that in a case where the region of (2) above is selected, that is, (2) a region where the label confidence is less than a specified threshold value (Th1), this region is selected, the label confidence ($conf_{sema}$) to be compared with the threshold value (Th1) is calculated in accordance with one of processing examples (Processing example 1) and (Processing example 2) shown in FIG. 6 described above.

For the low-confidence region extracted from the image, the processing in and after step S131 is executed.

For other regions, that is, regions other than the low-confidence region, no new processing is performed and the processing is terminated. For these regions, the body identification information indicated by the label set in the image analysis in step S112, for example, semantic segmentation, is used as it is as valid information.

(Step S121)

Next, the processing of steps S121 to S125 will be described.

As described above, the processing of steps S121 to S125 is processing executed by the communication unit (V2X communication) 121 to the high-confidence region object projection processing unit 125 of the information processing apparatus 100 shown in FIG. 2. That is, it is object analysis processing using received data of the communication unit (V2X communication) 121.

First, in step S121, communication data is received.

This processing is processing executed by the communication unit (V2X communication) 121 of the information processing apparatus 100 shown in FIG. 2.

The communication unit (V2X communication) 121 receives vehicle information including location information of each vehicle from surrounding vehicles by vehicle-to-vehicle communication (V2V communication) with the surrounding vehicles.

The received information of the communication unit (V2X communication) 121 is inputted to the communication information analysis unit 122, and analysis result data by the communication information analysis unit 122 is stored in the communication information analysis result storage unit 123.

(Step S122)

Next, in step S122, analysis of the received data is executed.

This processing is executed by the communication information analysis unit 122 shown in FIG. 2. The communication information analysis unit 122 analyzes the received information of the communication unit (V2X communication) 121, and stores analysis result data in the communication information analysis result storage unit 123.

As described above with reference to FIG. 7, the data stored in the communication information analysis result storage unit 123 as the analysis result by the communication information analysis unit 122 includes, for example, each of the following data.

(b1) $(x, y, z)_{obj}$: three-dimensional location information (GPS location) of an object, (b2) $Sens_{obj}$: GPS reception sensitivity information, (b3) $conf_{obj}$: confidence information of an own location $(x, y, z)_{obj}$, (b4) $label_{obj}$: an object label (object type information), (b5) $(w, h, d)_{obj}$, or $polygon_{obj}$: object shape and size information, and (b6) $(Pitch, Yaw, Roll)_{obj}$: an object position (a pitch, a yaw, a roll) information.

Note that the object shown in (b1) to (b6) is a communication partner of V2X communication, specifically, for example, a vehicle of the communication partner.

(Steps S123 to S124)

Next, in steps S123 to S124, extraction processing of a high-confidence region is executed.

This processing is processing executed by the high-confidence region extraction unit 124 shown in FIG. 2.

The high-confidence region extraction unit 124 extracts a high-confidence region (a high confidence object) in which confidence of three-dimensional location information $(x, y, z)_{obj}$ of an object received from a communication partner of the V2X communication, specifically, a vehicle of the communication partner, for example, the vehicle B 10b in the lower left figure of FIG. 7, is larger than a specified threshold value (Th2).

Note that the confidence of the three-dimensional location information $(x, y, z)_{obj}$ of the object received from the vehicle of the communication partner is calculated in accordance with any of Processing examples 1 and 2 shown in FIG. 8 described above.

The "high-confidence region" information extracted by the high-confidence region extraction unit 124 is inputted to the high-confidence region object projection processing unit 125.

Note that, for other regions, that is, regions other than the high-confidence region, no new processing is performed and the processing is terminated. For these regions, the body identification information indicated by the label set in the image analysis in step S112, for example, semantic segmentation, is used as it is as valid information.

(Step S125)

Next, in step S125, the high-confidence region extracted in steps S123 to S124 is projected onto a two-dimensional plane of a captured image of the image acquisition unit (the camera) 111.

This processing is executed by the high-confidence region object projection processing unit 125 shown in FIG. 2.

The high-confidence region object projection processing unit 125 projects the object region with high confidence extracted by the high-confidence region extraction unit 124, onto a two-dimensional image plane captured by the image acquisition unit (the camera) 111.

The object region with high confidence extracted by the high-confidence region extraction unit 124 is three-dimensional space region information that is occupied by an object and based on an object location and size received from the communication partner. The high-confidence region object projection processing unit 125 executes projection conversion processing of the three-dimensional space region occupied by the object, to generate a projection image $(u, v)_{obj}$ projected on the two-dimensional image plane captured by the image acquisition unit (the camera) 111.

(Step S131)

Next, processing of steps S131 to S133 will be described.

The processing of steps S131 to S133 is processing executed by the overlapping region ratio (IoU) calculation unit 131 and the label updating unit 132 of the information processing apparatus 100 shown in FIG. 2.

First, in step S131, matching degree calculation of object regions, that is, overlapping region ratio (IoU) calculation processing is executed.

This processing is processing executed by the overlapping region ratio (IoU) calculation unit 131.

This processing is the processing described above with reference to FIGS. 9A, 9B, and 9C. The overlapping region ratio (IoU) calculation unit 131 inputs the "low-confidence region 71 based on image analysis" information shown in FIG. 9A from the low-confidence region extraction unit 114 of the information processing apparatus 100 shown in FIG. 2.

Moreover, from the high-confidence region object projection processing unit 125 of the information processing apparatus 100 shown in FIG. 2, the "high-confidence region 72 based on communication data" information shown in FIG. 9B is inputted.

The overlapping region ratio (IoU) calculation unit 131 inputs these two pieces of object region information, and superimposes the two object regions on one image as shown in FIG. 9C.

The overlapping region ratio (IoU) calculation unit 131 uses the superimposed image of these two object regions, to calculate an overlapping region ratio (intersection of union: IoU) of each object region.

The overlapping region ratio (IoU) is calculated by the following calculation formula as described above with reference to FIG. 10.

Overlapping region ratio (IoU)=(overlapping region (Area of Overlap)/entire region (Area of Union))

The overlapping region ratio (IoU) calculated by the overlapping region ratio (IoU) calculation unit 131 is inputted to the label updating unit 132 of the information processing apparatus 100 shown in FIG. 2.

(Steps S132 to S133)

Processing of steps S132 to S133 is processing executed by the label updating unit 132 shown in FIG. 2.

The label updating unit 132 compares the overlapping region ratio (IoU) calculated by the overlapping region ratio (IoU) calculation unit 131 with a predetermined threshold value (Th3). That is, with the following Determination formula 3, overlapping region ratio (IoU)≥Th3    (Determination formula 3), an object region that satisfies the Determination formula 3 described above is selected.

Moreover, for the object region satisfying the above-described Determination formula 3, the label updating unit 132 acquires a label included in vehicle information received by the communication unit 121 from a communication partner object, that is, the label that has been described with reference to FIG. 7, (b4) $label_{obj}$: an object label (object type information), from the communication information analysis result storage unit 123.

The label updating unit 132 executes label updating processing of setting a label indicating an object type acquired from the communication information analysis result storage unit 123, as a label of the image analysis result storage unit 113.

This processing makes it possible to set a high-confidence label (object type information) obtained by V2X communication, for regions that are determined to be unknown objects of low-confidence regions, such as unknown regions (Unknown), in image analysis such as semantic segmentation.

That is, for regions where object identification is difficult and low confidence labels are set in image analysis, it becomes possible to set a label of high confidence acquired on the basis of V2X communication, and it becomes possible to reduce unknown regions and the low-confidence regions in an image captured by the camera. As a result, safe traveling of a vehicle is realized.

4. About Embodiment (Second Embodiment) of Generating and Using Object Analysis Result Based on Captured Image of Image Acquisition Unit (Camera), as Three-Dimensional Information Next, as a second embodiment, a description is given to an embodiment in which an object analysis result based on a captured image of an image acquisition unit (a camera) is generated and used as three-dimensional (3D) information.

In the embodiment described above, an acquired image of the image acquisition unit (the camera) 111 is a two-dimensional image. Whereas, object information received by the communication unit (V2X communication) 121 is three-dimensional location information $(x, y, z)_{obj}$ based on GPS, and shape and size information $(w, h, d)_{obj}$ of an object is also three-dimensional information.

Therefore, object information received by the communication unit (V2X communication) 121 has been projected onto a two-dimensional image plane acquired by the image acquisition unit (the camera) 111, to determine a matching degree of an object.

The second embodiment described next is an embodiment of generating an object identification result having three-dimensional information, by utilizing a plurality of continuously captured images, which are acquired images of an image acquisition unit (the camera) 111, or using three-dimensional map information or the like that can be received from a management server 20.

That is, for example, a three-dimensional semantic segmentation result is generated.

In the second embodiment, an object identification result including three-dimensional data is generated as an object identification result based on an acquired image of the image acquisition unit (the camera) 111.

Whereas, object information received by a communication unit (V2X communication) 121 is also three-dimensional data.

Therefore, in the present embodiment, it is possible to determine a matching degree of the object regions obtained from two paths in the three-dimensional data.

Figure 12:
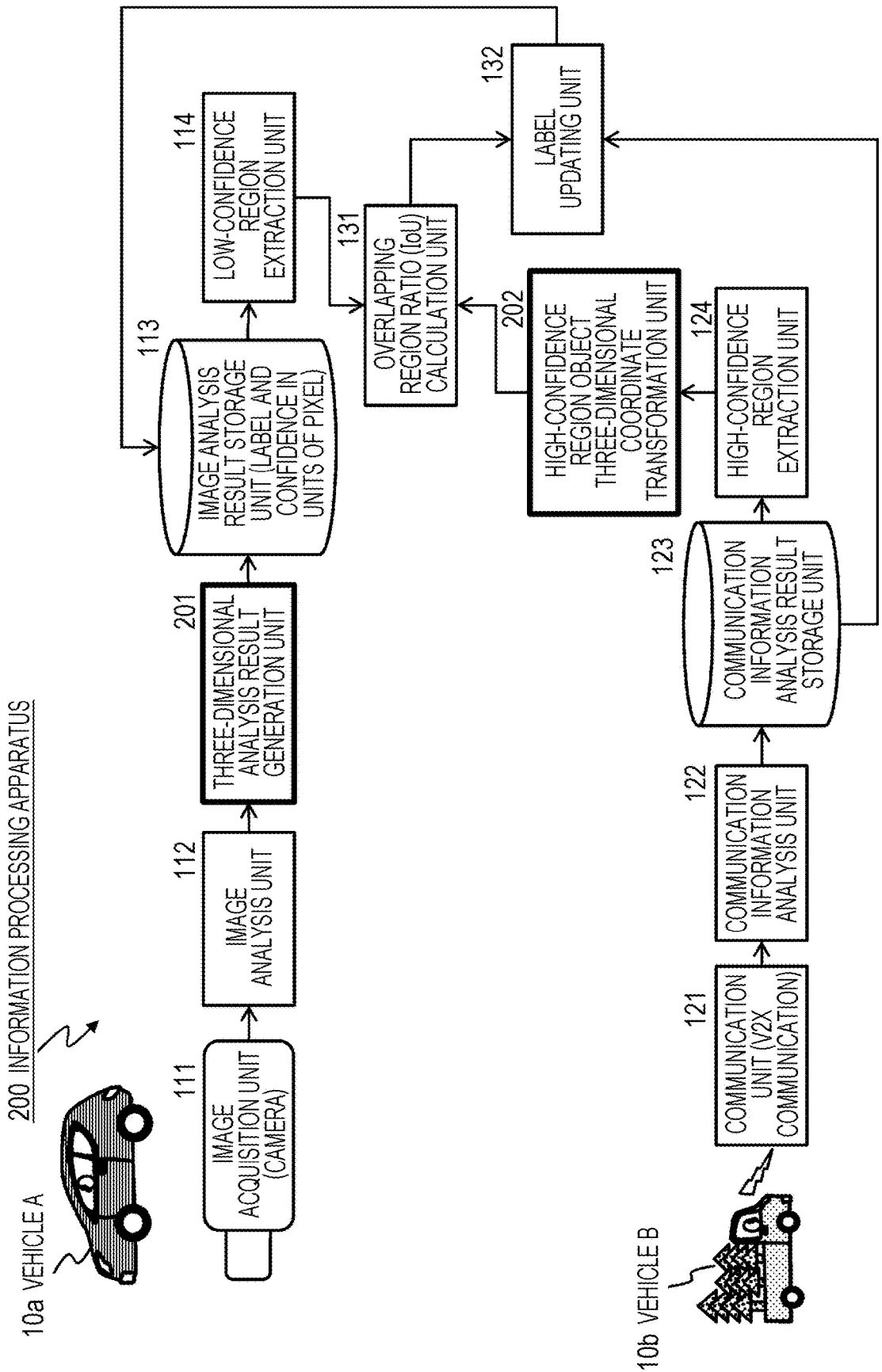
FIG. 12 is a diagram for explaining an example of a configuration and processing of a second embodiment of the present disclosure.

FIG. 12 is a block diagram showing a configuration example of an information processing apparatus 200 of the second embodiment.

The information processing apparatus 200 shown in FIG. 12 has a configuration similar to that of the information processing apparatus 100 described above with reference to FIG. 2. Differences are the following two points.

(1) A three-dimensional analysis result generation unit 201 is added between an image analysis unit 112 and an image analysis result storage unit 113, and (2) the high-confidence region object projection processing unit 124 in the configuration shown in FIG. 2 is replaced with a high-confidence region object three-dimensional coordinate transformation unit 202, these two points are different in the configuration.

Since other configurations are configurations similar to those of the first embodiment described above with reference to FIG. 2 and others, the common configuration will be briefly described, and the differences will be described in detail below.

The image acquisition unit (the camera) 111 captures, for example, an image of a vehicle A 10a in a traveling direction. The captured image is inputted to the image analysis unit 112. The image analysis unit 112 analyzes the captured image of the image acquisition unit (the camera) 111 and performs identification processing of a body (an object) in the image. That is, body identification (object identification) is executed as to what the body being captured in each image region of the captured image is.

The body identification (object identification) processing executed by the image analysis unit 112 is executed by applying an existing method, for example, a method such as pattern matching or semantic segmentation.

In the present embodiment, for each of the continuously captured images that are acquired images of the image acquisition unit (the camera) 111, the image analysis unit 112 sequentially executes body identification (object identification) processing, and sequentially inputs body identification (object identification) results corresponding to these plurality of continuously captured images, to the three-dimensional analysis result generation unit 201.

The three-dimensional analysis result generation unit 201 uses the body identification (object identification) results corresponding to the plurality of continuously captured images, to generate an object identification result having three-dimensional information.

Note that the three-dimensional analysis result generation unit 201 may have a configuration of receiving three-dimensional map information from an external server such as the management server 20, for example, and using this three-dimensional map information to generate an object identification result having three-dimensional information.

The three-dimensional analysis result generation unit 201 stores the generated object identification result having the three-dimensional information, in the image analysis result storage unit 113.

Figure 13:
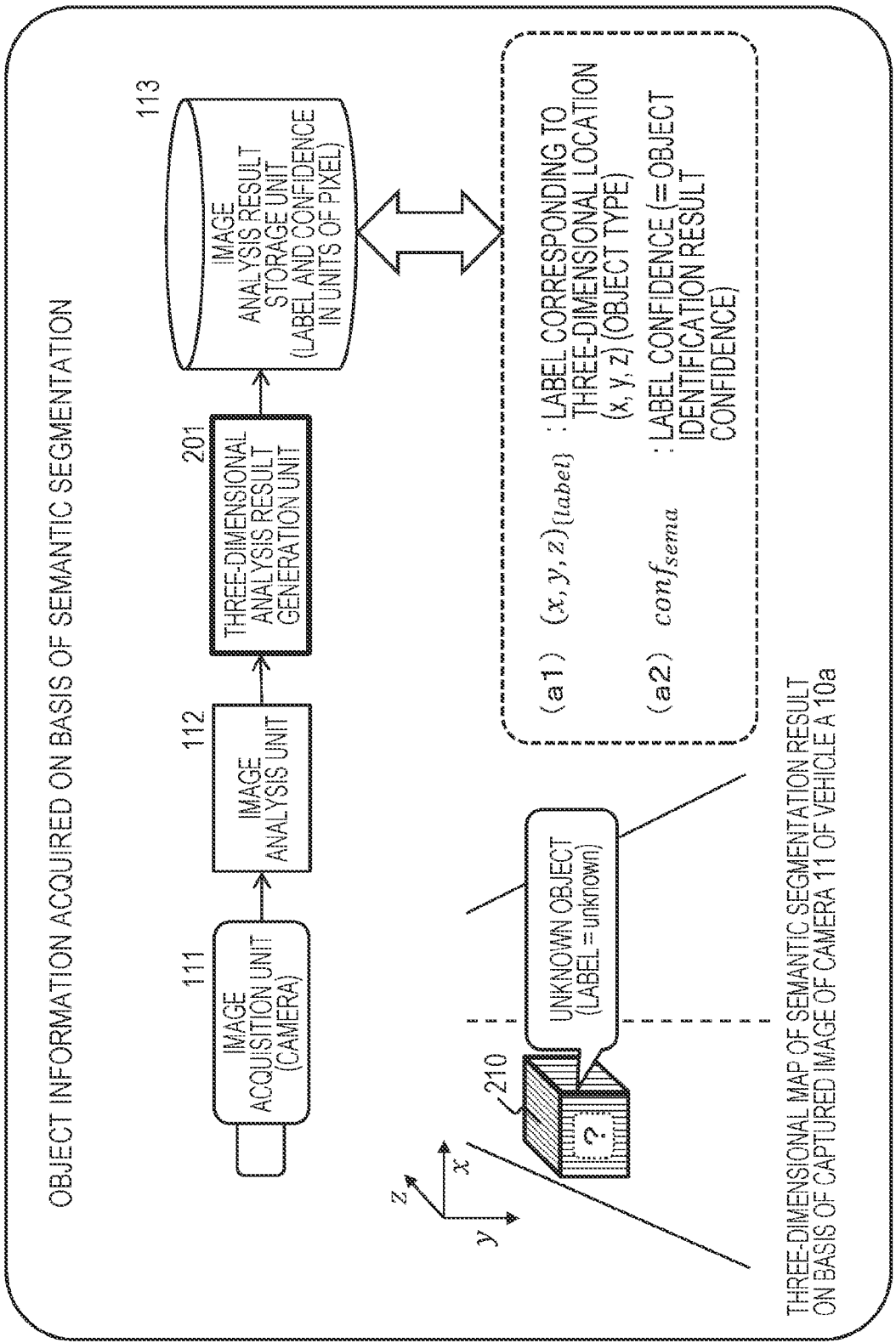
FIG. 13 is a view for explaining image analysis processing and stored data in an image analysis result storage unit.

With reference to FIG. 13, an example of data stored in the image analysis result storage unit 113 will be described. As shown in FIG. 13, the image analysis result storage unit 113 stores the following data generated by the three-dimensional analysis result generation unit 201.

(a1) (x, y, z)$_{\{label\}}$: a label corresponding to a three-dimensional pixel location (x, y, z) (object type=body identification result), and (a2) conf$_{sema}$: a label confidence (object identification result confidence).

The three-dimensional analysis result generation unit 201 generates these data in units of three-dimensional pixel location (x, y, z) of the image, and stores in the image analysis result storage unit 113.

Note that some regions in the three-dimensional image include regions in which object identification based on learning data is not possible. A label of such a region is set as label=unknown (unknown region) and confidence is not to be set for this region.

The low-confidence region extraction unit 114 uses the three-dimensional image analysis result stored in the image analysis result storage unit 113, to extract a three-dimensional region whose object identification result is low confidence.

Specifically, (1) a three-dimensional set as label=unknown (unknown region), and (2) a three-dimensional region where the label confidence is less than a specified threshold value (Th1), these two types of regions are extracted as "low-confidence regions (three-dimensional regions)".

Next, a description is given to a configuration and processing of the communication unit (V2X communication) 121, a communication information analysis unit 122, a communication information analysis result storage unit 123, a high-confidence region extraction unit 124, and the high-confidence region object three-dimensional coordinate transformation unit 202 of the information processing apparatus 200 shown in FIG. 12.

Since a configuration and processing of the communication unit (V2X communication) 121, the communication information analysis unit 122, the communication information analysis result storage unit 123, the high-confidence region extraction unit 124 are similar to those of the first embodiment described above with reference to FIG. 2 and later, description thereof will be omitted.

Processing executed by the high-confidence region object three-dimensional coordinate transformation unit 202 will be described.

The high-confidence region object three-dimensional coordinate transformation unit 202 inputs high-confidence object region information extracted by the high-confidence region extraction unit 124. An object region with high confidence extracted by the high-confidence region extraction unit 124 is three-dimensional space region information that is occupied by an object and based on an object location and size received from the communication partner.

However, a coordinate system that defines this three-dimensional location is highly likely to be a coordinate system different from a coordinate system of three-dimensional data including an object identification result based on a captured image of the image acquisition unit (the camera) 111 described above, that is, the three-dimensional data generated by the three-dimensional analysis result generation unit 201.

The high-confidence region object three-dimensional coordinate transformation unit 202 executes coordinate transformation of matching the coordinate system of the high-confidence three-dimensional object region information extracted by the high-confidence region extraction unit 124, with the coordinate system of the three-dimensional data generated by the three-dimensional analysis result generation unit 201.

By performing this coordinate transformation, it is possible to accurately determine a matching degree of object regions acquired by two different processing systems in the same coordinate system.

The three-dimensional region information of the object in the high-confidence region generated by the high-confidence region object three-dimensional coordinate transformation unit 202 is inputted to the overlapping region ratio (IoU) calculation unit 131.

Next, a description is given to a configuration and processing of the overlapping region ratio (IoU) calculation unit 131 and the label updating unit 132 of the information processing apparatus 200 shown in FIG. 12.

Processing executed by the overlapping region ratio (IoU) calculation unit 131 will be described with reference to FIGS. 14A, 14B, and 14C.

FIGS. 14A, 14B, and 14C shows each of the following figures.

FIG. 14A: A low-confidence object region (a three-dimensional region) acquired on the basis of image analysis (semantic segmentation), FIG. 14B: a high-confidence object region (a three-dimensional region) acquired on the basis of V2X communication, and FIG. 14C: a calculation processing example of an overlapping region ratio (IoU) of each object region (calculation of an overlapping region ratio of a three-dimensional region).

FIG. 14A shows a three-dimensional low-confidence region extracted by the low-confidence region extraction unit 114 of the information processing apparatus 200 shown in FIG. 12, that is, a three-dimensional low-confidence region extracted on the basis of a result of image analysis such as semantic segmentation.

By the low-confidence region extraction unit 114 of the information processing apparatus 200,
(1) a region set as label=unknown (unknown region), and
(2) a region where the label confidence is less than a specified threshold value (Th1),
these two types of regions are extracted as "low-confidence regions".

Note that both are three-dimensional regions.

A region 221 in the image shown in FIG. 14A is a "low-confidence region 221 based on image analysis". A three-dimensional region in an xyz three-dimensional space.

Whereas, FIG. 14B shows a high-confidence region extracted by the high-confidence region extraction unit 124 of the information processing apparatus 200 shown in FIG. 12, that is, a high-confidence region extracted on the basis of an analysis result of communication information received from a communication partner of V2X communication. Note that a region 222 shown in FIG. 14B, that is, a "high-confidence region 222 based on communication data" is a coordinate transformation result by the high-confidence region object three-dimensional coordinate transformation unit 202 for the high-confidence region extracted by the high-confidence region extraction unit 124.

That is, this is an image region after execution of coordinate transformation to match the coordinate system of the high-confidence three-dimensional object region information extracted by the high-confidence region extraction unit 124, with the coordinate system of the three-dimensional data generated by the three-dimensional analysis result generation unit 201.

By performing this coordinate transformation, it is possible to accurately determine a matching degree of object regions acquired by two different processing systems in the same coordinate system.

The overlapping region ratio (IoU) calculation unit 131 inputs
the "low-confidence region 221 based on image analysis" information shown in FIG. 14A from the low-confidence region extraction unit 114 of the information processing apparatus 100 shown in FIG. 12.

Moreover, from the high-confidence region object three-dimensional coordinate transformation unit 202 of the information processing apparatus 100 shown in FIG. 12, the "high-confidence region 222 based on communication data" information shown in FIG. 14B is inputted.

The overlapping region ratio (IoU) calculation unit 131 inputs these two pieces of three-dimensional object region information, and superimposes the two object regions on one image as shown in FIG. 14C.

The overlapping region ratio (IoU) calculation unit 131 uses the superimposed image of these two three-dimensional object regions, to calculate an overlapping region ratio (intersection of union:IoU) of each object region.

The overlapping region ratio (intersection of union:IoU) calculation processing calculates by the following calculation formula as described above with reference to FIG. 10.

Overlapping region ratio (IoU)=(overlapping region (Area of Overlap)/entire region (Area of Union))

However, in this example, the overlapping region (Area of Overlap) is a volume of an overlapping portion of two object regions.

The entire region (Area of Union) is an entire volume of two object regions.

For example, overlapping region ratio (IoU)=1 indicates overlapping region (Area of Overlap)=entire region (Area of Union), which means that the two three-dimensional object regions are completely overlapped.

In this way, the overlapping region ratio (IoU) is a value indicating an overlapping ratio of two three-dimensional object regions.

As shown in FIGS. 14A, 14B, and 14C, the overlapping region ratio (IoU) calculation unit 131 calculates the overlapping region ratio (IoU) of the "low-confidence region 221 based on image analysis" shown in FIG. 14A and the "high-confidence region 222 based on communication data" shown in FIG. 14B.

The overlapping region ratio (IoU) calculated by the overlapping region ratio (IoU) calculation unit 131 is inputted to the label updating unit 132 of the information processing apparatus 200 shown in FIG. 12.

The label updating unit 132 compares the overlapping region ratio (IoU) calculated by the overlapping region ratio (IoU) calculation unit 131 with a predetermined threshold value (Th3). That is, with the following Determination formula 3, overlapping region ratio (IoU)≥Th3    (Determination formula 3), an object region that satisfies the Determination formula 3 described above is selected.

Moreover, for the object region satisfying the above-described Determination formula 3, the label updating unit 132 acquires a label included in vehicle information received by the communication unit 121 from a communication partner object, that is, the label that has been described with reference to FIG. 7, (b4) $label_{obj}$: an object label (object type information), from the communication information analysis result storage unit 123.

The label updating unit 132 executes label updating processing of setting a label indicating an object type acquired from the communication information analysis result storage unit 123, as a label of the image analysis result storage unit 113.

This processing makes it possible to set a high-confidence label (object type information) obtained by V2X communication, for regions that are determined to be unknown objects of low-confidence regions, such as unknown regions (Unknown), in image analysis such as semantic segmentation.

That is, for regions where object identification is difficult and low confidence labels are set in image analysis, it becomes possible to set a label of high confidence acquired on the basis of V2X communication, and it becomes possible to reduce unknown regions and the low-confidence regions in an image captured by the camera. As a result, safe traveling of a vehicle is realized.

5. About Processing Sequence Executed by Information Processing Apparatus

Figure 15:
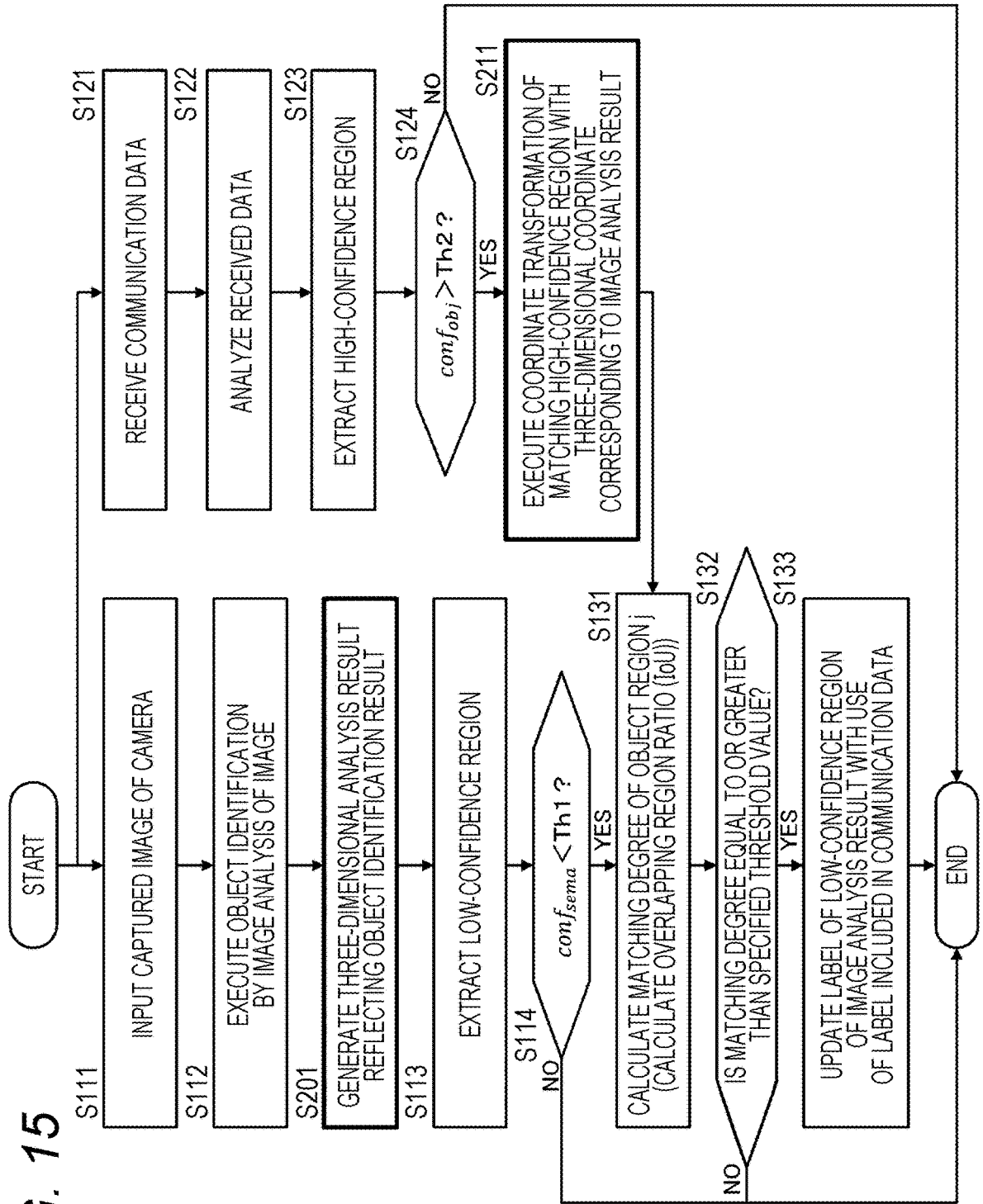
FIG. 15 is a view showing a flowchart for explaining a sequence of processing executed by an information processing apparatus mounted on a vehicle.

Next, with reference to a flowchart shown in FIG. 15, a description is given to a processing sequence executed by the information processing apparatus 200 shown in FIG. 12.

Processing according to the flowchart shown in FIG. 15 can be executed in accordance with, for example, a program stored in the storage unit of the information processing apparatus 200.

The flowchart shown in FIG. 15 has many processing parts in common with the flowchart shown in FIG. 11 described above as the flow of the first embodiment, and the following two points are different.

(1) Step S201 between step S112 and step S113 is added, and (2) processing of step S125 of the flow shown in FIG. 11 is replaced with step S211, these two points.

Since other processing is similar to the processing of the flowchart shown in FIG. 11 described above, it will be briefly described, and the above two points of processing will be described in detail.

(Steps S111 to S112)

First, processing of steps S111 to S112 will be described.

The processing of steps S111 to S114 is processing executed by the image acquisition unit (the camera) 111 to the low-confidence region extraction unit 114 of the information processing apparatus 100 shown in FIG. 12. That is, it is object analysis processing using a captured image of the image acquisition unit (the camera) 111.

The information processing apparatus 100 acquires a captured image in step S111.

This processing is processing executed by the image acquisition unit (the camera) 111 of the information processing apparatus 100 shown in FIG. 12. The image acquisition unit (the camera) 111 captures an image of a vehicle, for example, in a traveling direction.

The captured image of the image acquisition unit (the camera) 111 is inputted to the image analysis unit 112.

Next, in step S112, image analysis processing of the captured image of the image acquisition unit (the camera) 111 is executed.

This processing is processing executed by the image analysis unit 112.

The image analysis unit 112 inputs the captured image of the image acquisition unit (the camera) 111, and executes identification processing of a body included in the captured image. For example, as described above, body identification is performed using an existing technique such as pattern matching or semantic segmentation.

The image analysis unit 112 generates pair data of a "label (a body identification result)", which is a result of the body identification processing, and "label confidence" indicating confidence of the label in units of pixel.

Note that, in the present embodiment, for each of the continuously captured images that are acquired images of the image acquisition unit (the camera) 111, the image analysis unit 112 sequentially executes body identification (object identification) processing, and sequentially inputs body identification (object identification) results corresponding to these plurality of continuously captured images, to the three-dimensional analysis result generation unit 201.

(Step S201)

After the processing of step S112, processing of step S201 is executed.

The processing of step S201 is processing executed by the three-dimensional analysis result generation unit 201 shown in FIG. 12.

The three-dimensional analysis result generation unit 201 uses the body identification (object identification) results corresponding to the plurality of continuously captured images, to generate an object identification result having three-dimensional information.

Note that the three-dimensional analysis result generation unit 201 may have a configuration of receiving three-dimensional map information from an external server such as the management server 20, for example, and using this three-dimensional map information to generate an object identification result having three-dimensional information.

The three-dimensional analysis result generation unit 201 stores the generated object identification result having the three-dimensional information, in the image analysis result storage unit 113.

As described above with reference to FIG. 13, the image analysis result storage unit 113 stores the following data generated by the three-dimensional analysis result generation unit 201.

(a1) $(x, y, z)_{\{label\}}$: a label corresponding to a three-dimensional pixel location (x, y, z) (object type=body identification result), and (a2) $\text{conf}_{sema}$: a label confidence (object identification result confidence).

(Steps S113 to S114)

Next, in steps S113 to S114, low-confidence region extraction processing is executed using the "label (the body identification result)" and the "label confidence" corresponding to the three-dimensional pixel location stored in the image analysis result storage unit 113.

This processing is processing executed by the low-confidence region extraction unit 114 shown in FIG. 12.

The low-confidence region extraction unit 114 uses an image analysis result stored in the image analysis result storage unit 113, to extract a region whose object identification result is low confidence from a captured image of the image acquisition unit (the camera) 111.

Specifically, (1) a three-dimensional set as label=unknown (unknown region), and (2) a three-dimensional region where the label confidence is less than a specified threshold value (Th1), these two types of regions are extracted as "low-confidence regions (three-dimensional regions)".

Note that in a case where the region of (2) above is selected, that is, (2) a region where the label confidence is less than a specified threshold value (Th1), this region is selected, the label confidence ($conf_{sema}$) to be compared with the threshold value (Th1) is calculated in accordance with one of processing examples (Processing example 1) and (Processing example 2) shown in FIG. 6 described above.

For the low-confidence region extracted from the image, the processing in and after step S131 is executed.

For other regions, that is, regions other than the low-confidence region, no new processing is performed and the processing is terminated. For these regions, the body identification information indicated by the label set in the image analysis in step S112, for example, semantic segmentation, is used as it is as valid information.

(Steps S121 to S122)

Next, processing of steps S121 to S122 will be described.

Note that, the processing of steps S121 to S211 is processing executed by the communication unit (V2X communication) 121 to the high-confidence region object three-dimensional coordinate transformation unit 202 of the information processing apparatus 200 shown in FIG. 12. That is, it is object analysis processing using received data of the communication unit (V2X communication) 121.

First, in step S121, communication data is received.

This processing is processing executed by the communication unit (V2X communication) 121 of the information processing apparatus 200 shown in FIG. 12.

The communication unit (V2X communication) 121 receives vehicle information including location information of each vehicle from surrounding vehicles by vehicle-to-vehicle communication (V2V communication) with the surrounding vehicles.

The received information of the communication unit (V2X communication) 121 is inputted to the communication information analysis unit 122, and analysis result data by the communication information analysis unit 122 is stored in the communication information analysis result storage unit 123.

Next, in step S122, analysis of the received data is executed.

This processing is executed by the communication information analysis unit 122 shown in FIG. 12. The communication information analysis unit 122 analyzes the received information of the communication unit (V2X communication) 121, and stores analysis result data in the communication information analysis result storage unit 123.

As described above with reference to FIG. 7, the data stored in the communication information analysis result storage unit 123 as the analysis result by the communication information analysis unit 122 includes, for example, each of the following data.

(b1) $(x, y, z)_{obj}$: three-dimensional location information (GPS location) of an object, (b2) $Sens_{obj}$: GPS reception sensitivity information, (b3) $conf_{obj}$: confidence information of an own location $(x, y, z)_{obj}$ (b4) $label_{obj}$: an object label (object type information), (b5) $(w, h, d)_{obj}$, or $polygon_{obj}$: object shape and size information, and (b6) $(Pitch, Yaw, Roll)_{obj}$: an object position (a pitch, a yaw, a roll) information.

Note that the object shown in (b1) to (b6) is a communication partner of V2X communication, specifically, for example, a vehicle of the communication partner.

(Steps S123 to S124)

Next, in steps S123 to S124, extraction processing of a high-confidence region is executed.

This processing is processing executed by the high-confidence region extraction unit 124 shown in FIG. 12.

The high-confidence region extraction unit 124 extracts a high-confidence region (a high confidence object) in which confidence of three-dimensional location information $(x, y, z)_{obj}$ of an object received from a communication partner of the V2X communication, specifically, a vehicle of the communication partner, for example, the vehicle B 10b in the lower left figure of FIG. 7, is larger than a specified threshold value (Th2).

Note that the confidence of the three-dimensional location information $(x, y, z)_{obj}$ of the object received from the vehicle of the communication partner is calculated in accordance with any of Processing examples 1 and 2 shown in FIG. 8 described above.

The "high-confidence region" information extracted by the high-confidence region extraction unit 124 is inputted to the high-confidence region object projection processing unit 125.

Note that, for other regions, that is, regions other than the high-confidence region, no new processing is performed and the processing is terminated. For these regions, the body identification information indicated by the label set in the image analysis in step S112, for example, semantic segmentation, is used as it is as valid information.

(Step S211) Processing of the next step S211 is processing executed by the high-confidence region object three-dimensional coordinate transformation unit 202 shown in FIG. 12.

The high-confidence region object three-dimensional coordinate transformation unit 202 inputs high-confidence object region information extracted by the high-confidence region extraction unit 124. An object region with high confidence extracted by the high-confidence region extraction unit 124 is three-dimensional space region information that is occupied by an object and based on an object location and size received from the communication partner. However, a coordinate system that defines this three-dimensional location is highly likely to be a coordinate system different from a coordinate system of three-dimensional data including an object identification result based on a captured image of the image acquisition unit (the camera) 111 described above, that is, the three-dimensional data generated by the three-dimensional analysis result generation unit 201.

The high-confidence region object three-dimensional coordinate transformation unit 202 executes, in step S211, coordinate transformation of matching the coordinate system of the high-confidence three-dimensional object region information extracted by the high-confidence region extraction unit 124, with the coordinate system of the three-dimensional data generated by the three-dimensional analysis result generation unit 201.

By performing this coordinate transformation, it is possible to accurately determine a matching degree of object regions acquired by two different processing systems in the same coordinate system.

(Step S131)

Next, processing of steps S131 to S133 will be described.

The processing of steps S131 to S133 is processing executed by the overlapping region ratio (IoU) calculation unit 131 and the label updating unit 132 of the information processing apparatus 200 shown in FIG. 12.

First, in step S131, matching degree calculation of object regions, that is, overlapping region ratio (IoU) calculation processing is executed.

This processing is processing executed by the overlapping region ratio (IoU) calculation unit 131.

This processing is the processing described above with reference to FIGS. 14A, 14B, and 14C. The overlapping region ratio (IoU) calculation unit 131 inputs the "low-confidence region 221 based on image analysis" information shown in FIG. 14A, from the low-confidence region extraction unit 114 of the information processing apparatus 200 shown in FIG. 12.

Moreover, from the high-confidence region object three-dimensional coordinate transformation unit 202 of the information processing apparatus 100 shown in FIG. 12, the "high-confidence region 222 based on communication data" information shown in FIG. 14B is inputted.

The overlapping region ratio (IoU) calculation unit 131 inputs these two pieces of three-dimensional object region information, and superimposes the two object regions on one image as shown in FIG. 14C.

The overlapping region ratio (IoU) calculation unit 131 uses the superimposed image of these two three-dimensional object regions, to calculate an overlapping region ratio (intersection of union:IoU) of each object region.

The overlapping region ratio (intersection of union:IoU) calculation processing calculates by the following calculation formula as described above with reference to FIG. 10.

Overlapping region ratio (IoU)=(overlapping region (Area of Overlap)/entire region (Area of Union))

However, in this example, the overlapping region (Area of Overlap) is a volume of an overlapping portion of two object regions.

The overlapping region ratio (IoU) calculated by the overlapping region ratio (IoU) calculation unit 131 is inputted to the label updating unit 132 of the information processing apparatus 200 shown in FIG. 12.

(Steps S132 to S133)

Processing of steps S132 to S133 is processing executed by the label updating unit 132 shown in FIG. 12.

The label updating unit 132 compares the overlapping region ratio (IoU) calculated by the overlapping region ratio (IoU) calculation unit 131 with a predetermined threshold value (Th3). That is, with the following Determination formula 3, overlapping region ratio (IoU)≥Th3      (Determination formula 3), an object region that satisfies the Determination formula 3 described above is selected.

Moreover, for the object region satisfying the above-described Determination formula 3, the label updating unit 132 acquires a label included in vehicle information received by the communication unit 121 from a communication partner object, that is, the label that has been described with reference to FIG. 7, (b4) label$_{obj}$: an object label (object type information), from the communication information analysis result storage unit 123.

The label updating unit 132 executes label updating processing of setting a label indicating an object type acquired from the communication information analysis result storage unit 123, as a label of the image analysis result storage unit 113.

This processing makes it possible to set a high-confidence label (object type information) obtained by V2X communication, for regions that are determined to be unknown objects of low-confidence regions, such as unknown regions (Unknown), in image analysis such as semantic segmentation.

That is, for regions where object identification is difficult and low confidence labels are set in image analysis, it becomes possible to set a label of high confidence acquired on the basis of V2X communication, and it becomes possible to reduce unknown regions and the low-confidence regions in an image captured by the camera. As a result, safe traveling of a vehicle is realized.

6. About Processing in Cases where Unknown Region and Low-Confidence Region are Overlapped and are not Overlapped Next, processing in cases where an unknown region and a low-confidence region are overlapped and are not overlapped is described.

In the first and second embodiments described above, a description has been given with an assumption that an unknown region or a low-confidence region analyzed in image analysis is a single object, for example, a single vehicle. However, in reality, there may be a case where the unknown region or the low-confidence region extracted from the image is not a single object but multiple objects, for example, a region including a plurality of vehicles.

Processing in such a case will be described below.

FIG. 16 is a view for explaining a processing example in a case where the unknown region or the low-confidence region extracted from the image is not a single object but multiple objects, for example, a region including a plurality of vehicles.

In both the first embodiment and the second embodiment described above, at the end, in a case where a region matching rate of the low-confidence region (including the unknown region) acquired by image analysis and the high-confidence region acquired by V2X communication is high, a label (object type information) of the high-confidence region acquired by V2X communication is used to update a label of the image analysis result.

The region matching rate is determined on the basis of comparison between an overlapping region rate (IoU) calculated by the overlapping region ratio (IoU) calculation unit 131, that is, an overlapping region ratio (IoU) calculated on the basis of the following formula overlapping region ratio (IoU)=(overlapping region (Area of Overlap)/entire region (Area of Union)), and a specified threshold value (Th3).

That is, the label updating unit 132 compares the overlapping region ratio (IoU) calculated by the overlapping region ratio (IoU) calculation unit 131 with a predetermined threshold value (Th3). That is, with the following Determination formula 3, overlapping region ratio (IoU)≥Th3      (Determination formula 3), an object region that satisfies the Determination formula 3 described above is selected.

The label updating unit 132 acquires, from the communication information analysis result storage unit 123, a label (object type information) included in vehicle information received by the communication unit 121 from the communication partner object, for an object region that satisfies the above-described Determination formula 3, and executes label updating processing of setting the label indicating the object type as the label of the image analysis result storage unit 113.

However, in a case where the unknown region or the low-confidence region extracted from the image is not a single object but multiple objects, for example, a region including multiple vehicles, it may be difficult to perform the above-described processing.

FIG. 16 is a view showing a processing example executed by the overlapping region ratio (IoU) calculation unit 131 in such a case.

In a case where the unknown region or the low-confidence region extracted from the image is not a single object, the overlapping region ratio (IoU) calculation unit 131 executes, for example, (Processing example 1) or (Processing example 2) shown in FIG. 16.

(Processing example 1) is processing in a case where an unknown region or a low-confidence region extracted from an image can be separated in units of individual objects. For example, there is also a case where it is possible to separate one unknown region or low confidence region in units of individual objects, by using boundary data such as edge information obtained from a captured image. In such a case, the overlapping region ratio (IoU) is calculated in units of the separated individual object.

(Processing example 2) is processing in a case where an unknown region or a low-confidence region extracted from an image cannot be separated in units of individual objects. In this case, the overlapping region ratio (IoU) is calculated in a single region, with single unknown region or low confidence region as a single object.

Next, with reference to FIG. 17, a description is given to a setting example of a processing order in a case where multiple unknown regions and low-confidence regions are detected from an image and there is no overlap with each other.

As shown in FIG. 17, in a case where multiple unknown regions and low-confidence regions are detected from an image and there is no overlap with each other, processing is executed with priority since there is a higher risk of collision, contact, or the like in an unknown region or a low-confidence region with a short distance.

That is, the processing is sequentially executed from a region with a short distance to a region with a long distance. However, in a case where parallel processing is possible, processing for each object may be executed in parallel.

7. About Other Embodiments

Next, other embodiments will be described.

In the first and second embodiment described above, a description has been given as a setting in which the communication unit (V2X communication) 121 receives multicast transmission data transmitted by a vehicle.

That is, for example, a description has been given as a configuration for directly receiving vehicle information transmitted from a vehicle recognized as an unknown object in image analysis, and analyzing the received vehicle information.

Note that the vehicle information to be received is, for example, the following data described above with reference to FIG. 7.

(b1) $(x, y, z)_{obj}$: three-dimensional location information (GPS location) of an object,
(b2) $Sens_{obj}$: GPS reception sensitivity information,
(b3) $conf_{obj}$: confidence information of an own location $(x, y, z)_{obj}$,
(b4) $label_{obj}$: an object label (object type information),
(b5) $(w, h, d)_{obj}$, or $polygon_{obj}$: object shape and size information, and
(b6) $(Pitch, Yaw, Roll)_{obj}$: an object position (a pitch, a yaw, a roll) information.

Note that the object shown in (b1) to (b6) is a communication partner of V2X communication, specifically, for example, a vehicle of the communication partner.

These types of vehicle information may be received by, for example, the following method, without limiting to a method of directly receiving transmission data from a vehicle recognized as an unknown object.

Figure 18:
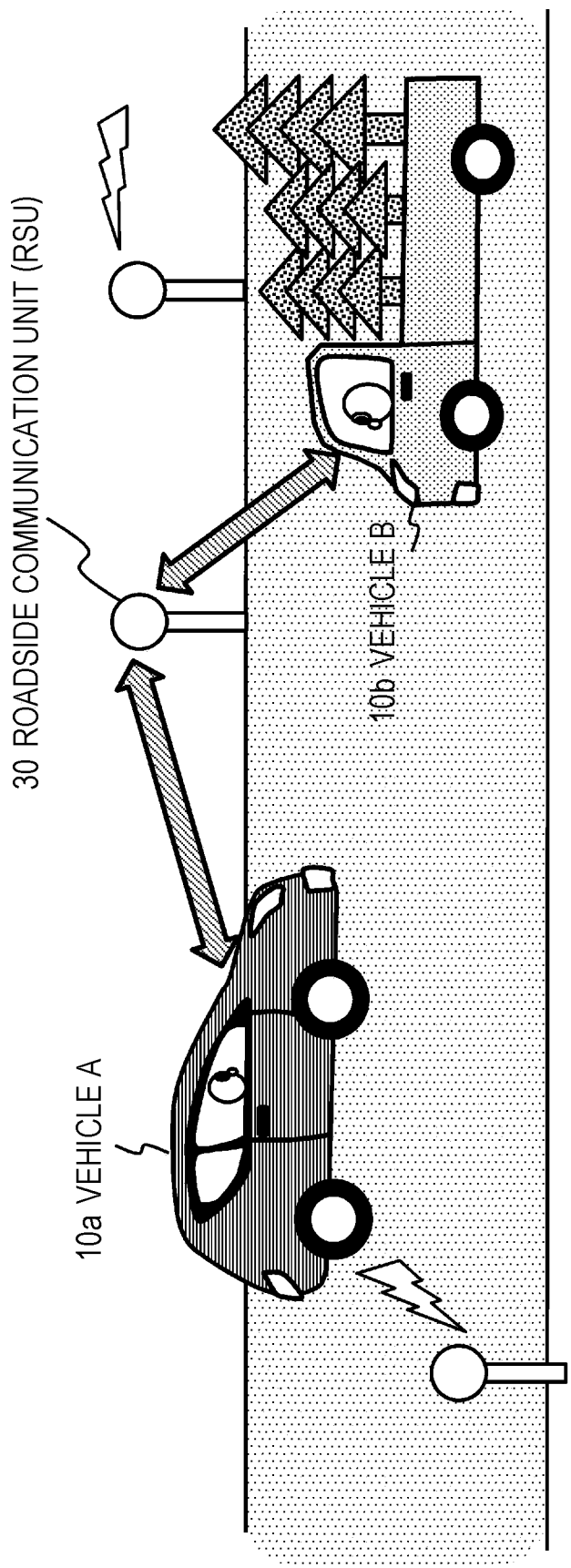
FIG. 18 is a view for explaining an example of transmission/reception of vehicle information via infrastructure.
Figure 19:
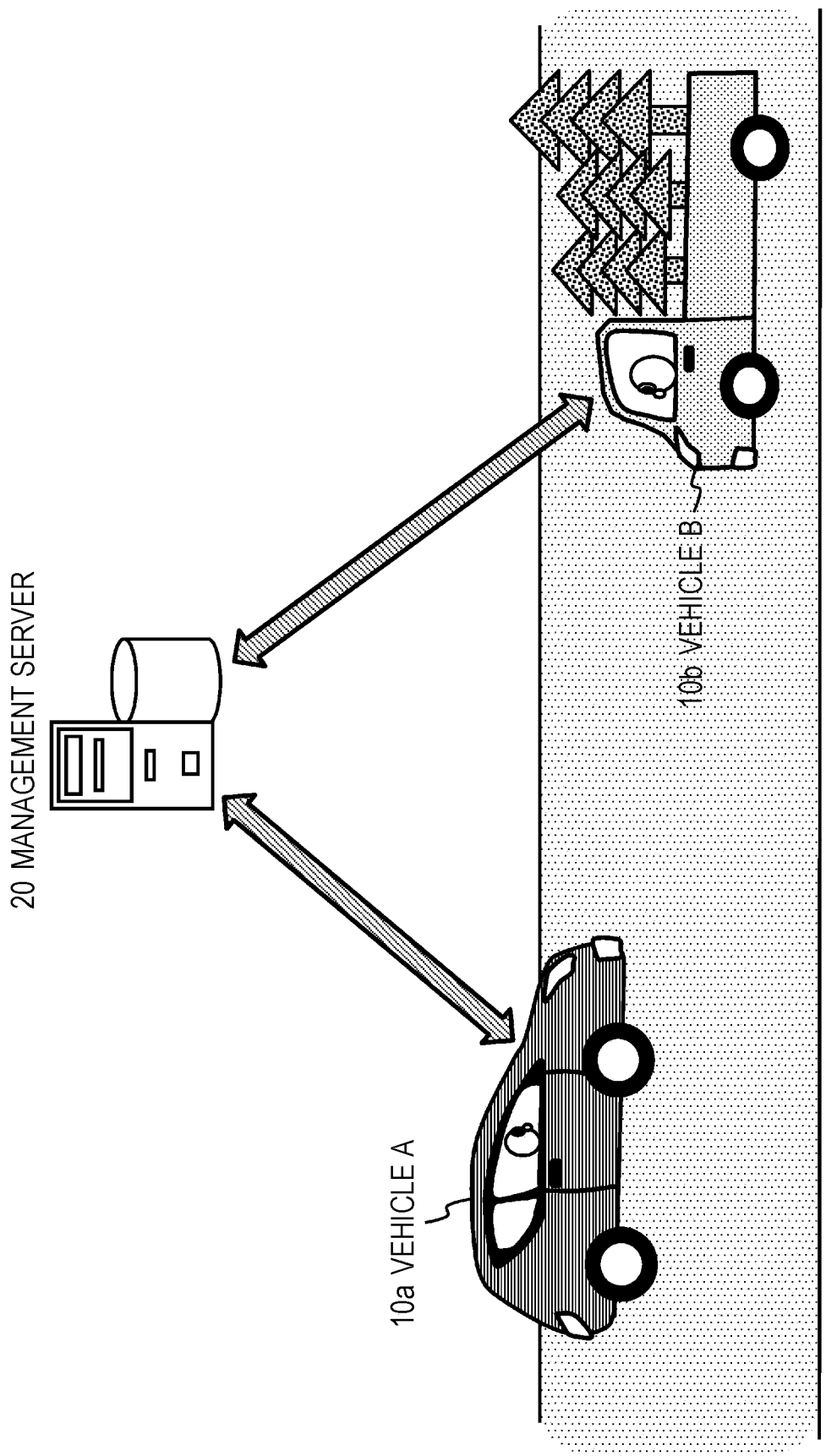
FIG. 19 is a view for explaining an example of transmission/reception of vehicle information via a management server.
Figure 20:
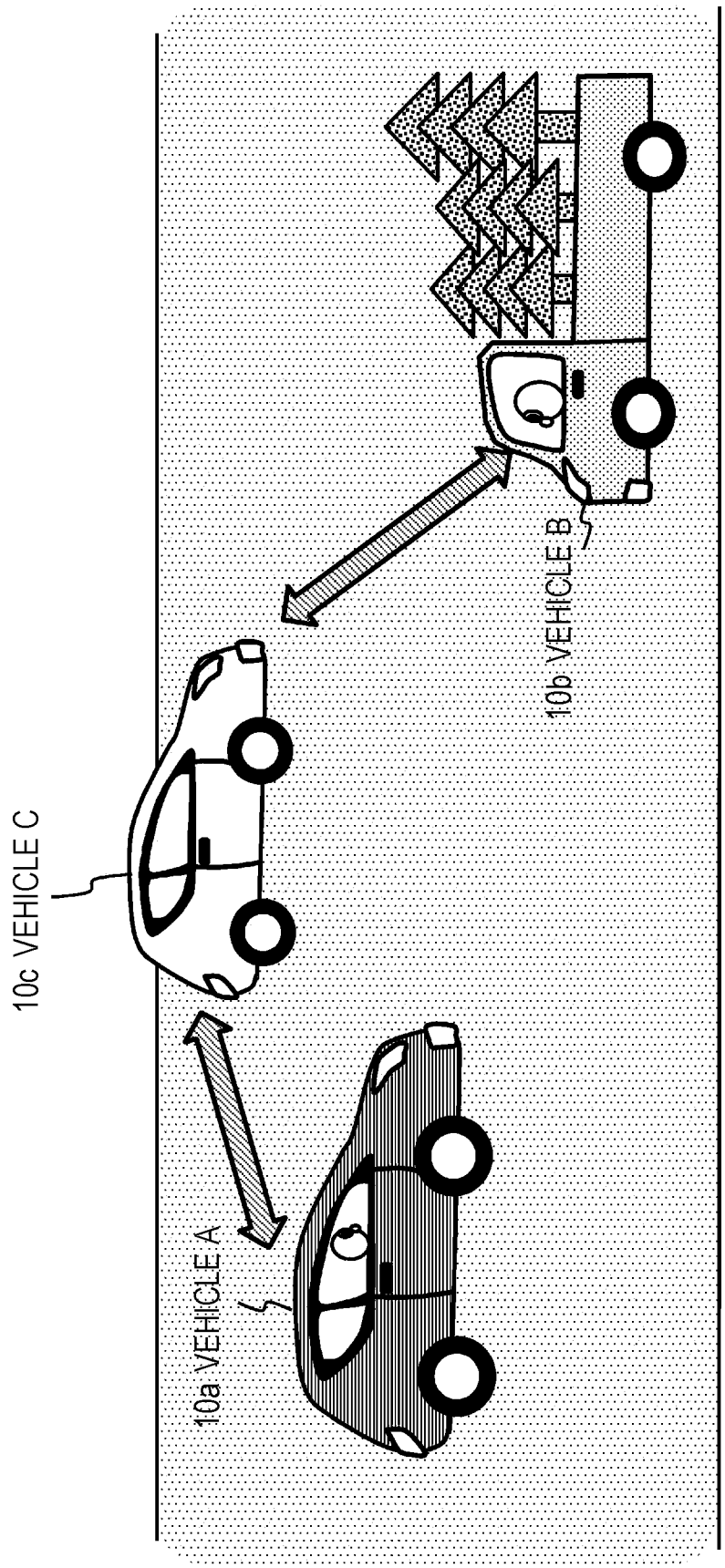
FIG. 20 is a view for explaining an example of transmission/reception of vehicle information via another vehicle.
Figure 21:
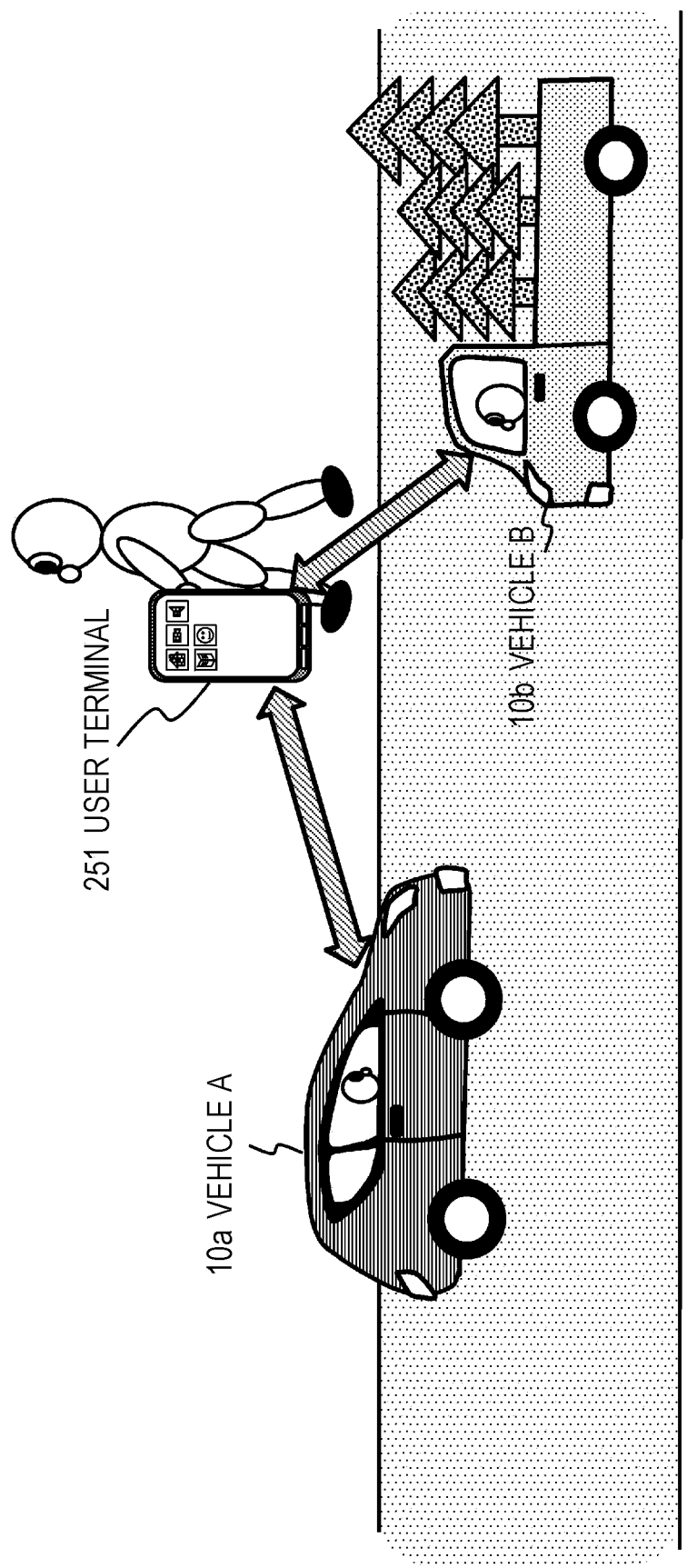
FIG. 21 is a view for explaining an example of transmission/reception of vehicle information via a user terminal.

(1) As shown in FIG. 18, reception is performed via an infrastructure facility such as the roadside communication unit (RSU) 30.
(2) As shown in FIG. 19, reception is performed via the management server 20.
(3) As shown in FIG. 20, reception is performed via another vehicle C 10c.
(4) As shown in FIG. 21, reception is performed via a user terminal 251 such as, for example, a smartphone held by a person walking on a sidewalk.

For example, it is possible to perform such data transmission/reception processing.

Furthermore, in the configuration using the management server 20 shown in FIG. 19, it is also possible to adopt a configuration of recording vehicle information acquired in advance from each vehicle on a dynamic map provided by the management server 20 to each vehicle, or vehicle information that is continuously acquired, and providing to each vehicle.

8. About Configuration Example of Information Processing Apparatus

Figure 22:
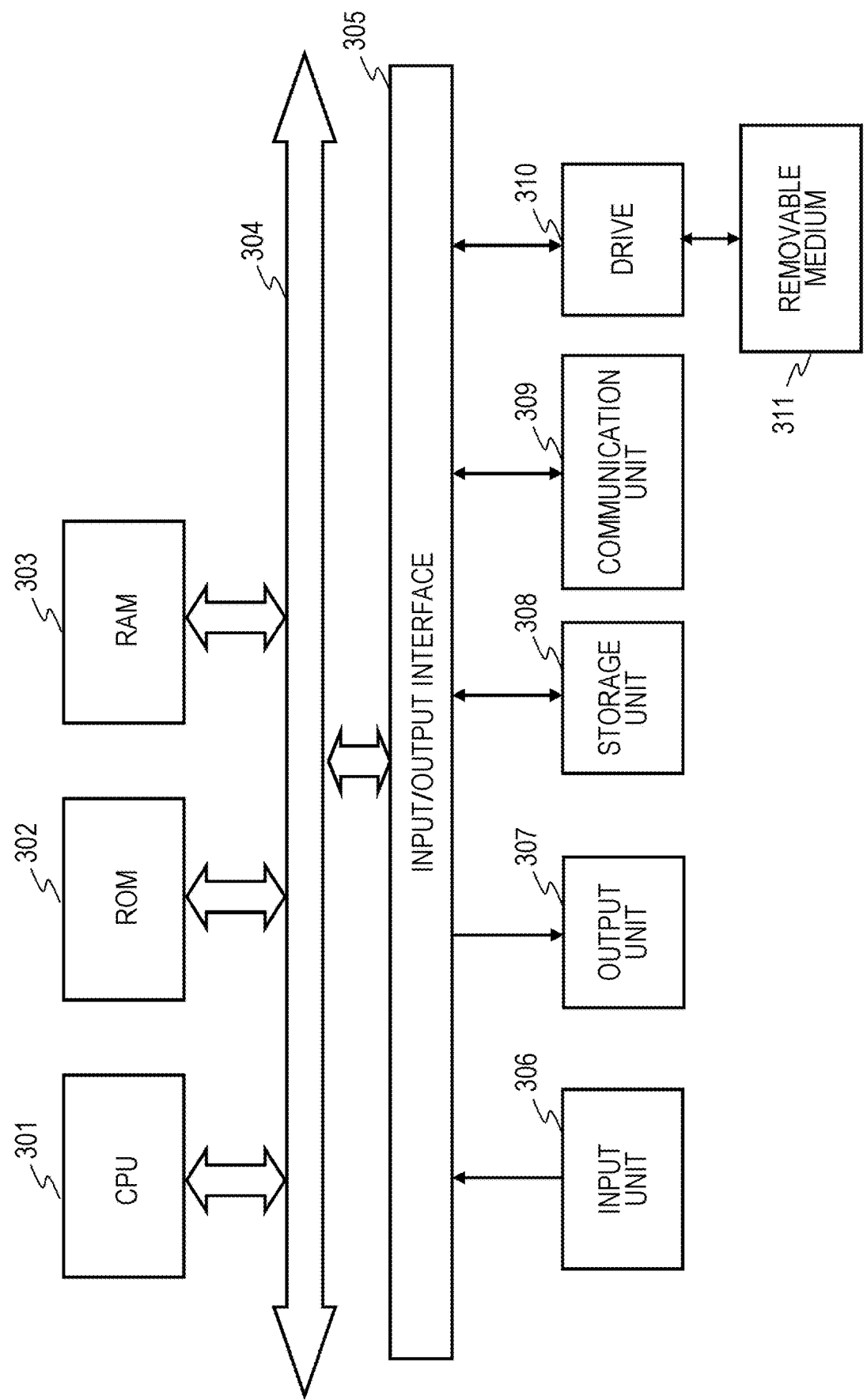
FIG. 22 is a diagram for explaining a hardware configuration example of the information processing apparatus.

Next, with reference to FIG. 22, a description is given to a specific hardware configuration example of the information processing apparatus that executes the above-described processing. This is a hardware configuration example applicable as an information processing apparatus mounted on a vehicle.

FIG. 22 is a view showing a hardware configuration example of the information processing apparatus.

A central processing unit (CPU) 301 functions as a data processing unit that executes various kinds of processing in accordance with a program stored in a read only memory (ROM) 302 or a storage unit 308. For example, the processing according to the sequence described in the above-described embodiment is executed. A random access memory (RAM) 303 stores a program executed by the CPU 301 and data. These CPU 301, ROM 302, and RAM 303 are connected to each other by a bus 304.

The CPU 301 is connected to an input/output interface 305 via the bus 304. The input/output interface 305 is connected with an input unit 306 including various switches, a keyboard, a touch panel, a mouse, a microphone, a data acquisition unit such as a sensor, a camera, and GPS, and the like, and with an output unit 307 including a display, a speaker, and the like. Note that the output unit 307 also outputs drive information for a drive unit of a mobile device.

The CPU 301 inputs commands, status data, and the like inputted from the input unit 306, executes various kinds of processing, and outputs processing results to, for example, the output unit 307.

The storage unit 308 connected to the input/output interface 305 includes, for example, a hard disk or the like, and stores a program executed by the CPU 301 and various data. A communication unit 309 functions as a transmission/reception unit for data communication via a network such as the Internet or a local area network, and communicates with an external device.

A drive 310 connected to the input/output interface 305 drives a removable medium 311 such as a magnetic disk, an optical disk, a magneto-optical disk, or a semiconductor memory such as a memory card, and executes data recording and reading.

9. Summary of Configuration of Present Disclosure

The embodiments of the present disclosure have been described in detail with reference to the specific embodiments. However, it is obvious that those skilled in the art can make modifications and substitutions of the embodiments without departing from the scope of the present disclosure. In other words, the present invention has been disclosed in the form of exemplification, and should not be construed as limiting. In order to determine the scope of the present disclosure, the section of the claims should be taken into consideration.

Note that the technology disclosed in the present specification can have the following configurations.

(1) An information processing apparatus including:
an image analysis unit configured to analyze a captured image of a camera, execute object identification of an image, and set a label as an identification result to an image region;
a low-confidence region extraction unit configured to extract a low-confidence region with low confidence of object identification from an analysis result by the image analysis unit; and
a label updating unit configured to update a label of the low-confidence region on the basis of information received via a communication unit.

(2) The information processing apparatus according to (1), in which
the label updating unit
updates a label of the low-confidence region in a case where a matching rate between an object region analyzed from information received via the communication unit and the low-confidence region is equal to or greater than a specified threshold.

(3) The information processing apparatus according to (1) or (2), further including:
a communication information analysis unit configured to analyze an object region from information received via the communication unit;
a high-confidence region extraction unit configured to extract a high-confidence region with high confidence, of an object region analyzed by the communication information analysis unit; and
an overlapping region ratio calculation unit configured to calculate a matching rate between the low-confidence region acquired from an image analysis result and a high-confidence region acquired from a communication information analysis result, in which
the label updating unit
updates a label of a region where the matching rate is equal to or higher than a specified threshold value, on the basis of object information included in received information received via the communication unit.

(4) The information processing apparatus according to any one of (1) to (3), in which
the image analysis unit
has a configuration of calculating label confidence indicating confidence of a label, in addition to a label as an object identification result in an image, and
the low-confidence region extraction unit
extracts the low-confidence region by using the label confidence.

(5) The information processing apparatus according to (4), in which the label confidence is a value adjusted to decrease as an object distance increases.

(6) The information processing apparatus according to any one of (1) to (5), in which the low-confidence region includes a region determined to be an unknown region in object identification by the image analysis unit.

(7) The information processing apparatus according to any one of (1) to (6), in which received information received via the communication unit includes
object location information of an object that is a communication partner, and a label indicating an object type, and
the label updating unit
updates a label by using a label included in the received information.

(8) The information processing apparatus according to (3), in which
received information received via the communication unit further includes
confidence of object location information of an object that is a communication partner, and
the high-confidence region extraction unit
extracts the high-confidence region on the basis of confidence of the object location information.

(9) The information processing apparatus according to (3), in which
received information received via the communication unit includes
global positioning system (GPS) location information measured by an object that is a communication partner, and
the high-confidence region extraction unit
calculates confidence of the GPS location information on the basis of GPS reception sensitivity information included in the received information received via the communication unit.

(10) The information processing apparatus according to (3), in which
the overlapping region ratio calculation unit
calculates intersection of union (IoU) indicating an overlapping region ratio of the low-confidence region acquired from an image analysis result and a high-confidence region acquired from a communication information analysis result.

(11) The information processing apparatus according to (10), in which
the overlapping region ratio calculation unit
calculates the overlapping region ratio (IoU) as an overlapping region ratio (IoU) in a two-dimensional plane or an overlapping region ratio (IoU) in a three-dimensional space.

(12) The information processing apparatus according to any one of (1) to (11), in which
the communication unit
directly receives information transmitted by an object included in the low-confidence region, from the object.

(13) The information processing apparatus according to any one of (1) to (11), in which
the communication unit
receives transmission information of an object included in the low-confidence region, via a server, an infrastructure facility, a user terminal, or another object.

(14) The information processing apparatus according to any one of (1) to (11), in which
the communication unit
receives information regarding an object included in the low-confidence region, from a server.
(15) An information processing system including a first mobile device and a second mobile device, in which
the first mobile device includes:
a location information acquisition unit configured to acquire location information of the first mobile device; and
a communication unit configured to transmit vehicle information including the location information and a label indicating an object type, and
the second mobile device includes:
an image analysis unit configured to analyze a captured image of a camera mounted on the second mobile device, execute object identification of an image, and set a label as an identification result to an image region;
a low-confidence region extraction unit configured to extract a low-confidence region with low confidence of object identification from an analysis result by the image analysis unit;
a communication unit configured to receive the vehicle information transmitted by the first mobile device; and
a label updating unit configured to update a label of the low-confidence region set by the image analysis unit to a label received from the first mobile device, on the basis of the vehicle information.
(16) An information processing method executed in an information processing apparatus, the information processing method being for executing:
an image analysis processing step of, by an image analysis unit, analyzing a captured image of a camera, executing object identification of an image, and setting a label as an identification result to an image region;
a low-confidence region extraction step of, by a low-confidence region extraction unit, extracting a low-confidence region with low confidence of object identification from an analysis result in the image analysis step; and
a label updating step of, by a label updating unit, updating a label of the low-confidence region on the basis of information received via a communication unit.
(17) An information processing method executed in an information processing system including a first mobile device and a second mobile device, in which
the first mobile device
acquires location information of the first mobile device, and
transmits vehicle information including the location information and a label indicating an object type, and
the second mobile device executes:
image analysis processing of analyzing a captured image of a camera mounted on the second mobile device, and setting, to an image region, a label as an object identification result of an image;
low-confidence region extraction processing of extracting a low-confidence region with low confidence of object identification; and
label updating processing of updating a label of the low-confidence region set by the image analysis unit to a label received from the first mobile device, on the basis of the vehicle information transmitted by the first mobile device.
(18) A program for executing information processing in an information processing apparatus, the program being for causing:
an image analysis unit to execute an image analysis processing step of analyzing a captured image of a camera, executing object identification of an image, and setting a label as an identification result to an image region;
a low-confidence region extraction unit to execute a low-confidence region extraction step of extracting a low-confidence region with low confidence of object identification from an analysis result in the image analysis step; and
a label updating unit to execute a label updating step of updating a label of the low-confidence region on the basis of information received via a communication unit.

The series of processing described in the specification can be executed by hardware, software, or a combined configuration of both. In a case of executing processing by software, a program recording a processing sequence can be installed and executed in a memory in a computer incorporated in dedicated hardware, or a program can be installed and executed in a general-purpose computer capable of executing various types of processing. For example, the program can be recorded in advance on a recording medium. The program can be installed from a recording medium to a computer, or can be received via a network such as a local area network (LAN) or the Internet, and installed in a recording medium such as an incorporated hard disk.

Note that the various types of processing described in the specification may be executed not only in a chronological order in accordance with the description, but may also be executed in parallel or individually depending on processing capability of a device that executes the processing or depending on the necessity. Furthermore, a system in this specification is a logical set configuration of a plurality of devices, and is not limited to one in which a device of each configuration is in a same casing.

INDUSTRIAL APPLICABILITY

As described above, according to a configuration of one embodiment of the present disclosure, a device and a method for enabling safe traveling by performing image analysis and body identification using inter-vehicle communication information is realized.

Specifically, for example, there are provided: an image analysis unit configured to analyze a captured image of a camera mounted on a mobile device, execute object identification of an image, and set a label as an identification result to an image region; a low-confidence region extraction unit configured to extract a region with low confidence of object identification from an image analysis result; and a label updating unit configured to update a label of the low-confidence region on the basis of information received via a communication unit. The label updating unit updates a label in a case where a matching rate between an object region analyzed from information received via the communication unit and the low-confidence region is equal to or greater than a specified threshold.

This configuration makes it possible to realize a device and a method for enabling safe traveling by performing image analysis and body identification using inter-vehicle communication information.

REFERENCE SIGNS LIST

10 Vehicle
20 Management server
30 Roadside communication unit (RSU)
50 Network
100 Information processing apparatus
111 Image acquisition unit (camera)
112 Image analysis unit
113 Image analysis result storage unit
114 low-confidence region extraction unit
121 Communication unit (V2X communication)
122 Communication information analysis unit
123 Communication information analysis result storage unit
124 High-confidence region extraction unit
125 High-confidence region object projection processing unit
131 Overlapping region ratio (IoU) calculation unit
132 Label updating unit
201 Three-dimensional analysis result generation unit
202 High-confidence region object three-dimensional coordinate transformation unit
301 CPU
302 ROM
303 RAM
304 Bus
305 Input/output interface
306 Input unit
307 Output unit
308 Storage unit
309 Communication unit
310 Drive
311 Removable medium

The invention claimed is:

1. An information processing apparatus, comprising:
at least one processor configured to:
analyze an image captured by a camera;
execute object identification to identify an object in at least one image region of a plurality of image regions in the captured image;
set a label, as an identification result, to each image region of the plurality of image regions in the captured image based on the object identification;
analyze the set label of each image region of the plurality of image regions in the captured image;
determine a label confidence score for the set label of each image region of the plurality of image regions based on the analysis of the set label of each image region of the plurality of image regions,
wherein the label confidence score indicates a confidence of the object identification for the set label of each image region of the plurality of image regions;
extract a low-confidence region in the captured image based on the label confidence score for the set label of each image region of the plurality of image regions,
wherein a label confidence score of the low-confidence region is lowest among the plurality of image regions;
receive information associated with the object;
analyze an object region associated with the object based on the received information;
update a label of the low-confidence region based a matching rate between the object region analyzed from the received information and the low-confidence region being equal to or greater than a specified threshold value;
extract a high-confidence region in the captured image based on the label confidence score for the set label of each image region of the plurality of image regions,
wherein a label confidence score of the high-confidence region is highest among the plurality of image regions;
calculate a matching rate between the low-confidence region and the high-confidence region; and
update, based on the received information, the label of the high-confidence region based on the matching rate between the low-confidence region and the high-confidence region being equal to or higher than the specified threshold value.

2. The information processing apparatus according to claim 1, wherein the at least one processor is further configured to decrease the label confidence score based on an increase in an object distance of the object from the camera.

3. The information processing apparatus according to claim 1, wherein the at least one processor is further configured to determine an unknown region as the low-confidence region.

4. The information processing apparatus according to claim 1, wherein
the received information includes object location information of the object, and a label indicating an object type of the object,
the object is a communication partner of the information processing apparatus, and
the at least one processor is further configured to update the set label of each image region of the plurality of image regions based on the label, indicating the object type, which is included in the received information.

5. The information processing apparatus according to claim 1, wherein
the received information includes a confidence of object location information of the object,
the object is a communication partner of the information processing apparatus, and
the at least one processor is further configured to extract the high-confidence region based on the confidence of the object location information.

6. The information processing apparatus according to claim 1, wherein
the received information includes global positioning system (GPS) location information measured by the object, and GPS reception sensitivity information,
the object is a communication partner of the information processing apparatus, and
the at least one processor is further configured to calculate a confidence of the GPS location information based on GPS reception sensitivity information which is included in received information.

7. The information processing apparatus according to claim 1, wherein the at least one processor is further configured to calculate intersection of union (IoU) indicating an overlapping region ratio of the low-confidence region and the high-confidence region.

8. The information processing apparatus according to claim 7, wherein the at least one processor is further configured to calculate the overlapping region ratio (IoU) as one of an overlapping region ratio (IoU) in a two-dimensional plane or an overlapping region ratio (IoU) in a three-dimensional space.

9. The information processing apparatus according to claim 1, wherein the received information is transmitted by the object included in the low-confidence region.

10. The information processing apparatus according to claim 1, wherein the at least one processor is further configured to receive, via a server, transmission information of the object included in the low-confidence region from at least one of an infrastructure facility, a user terminal, or another object.

11. The information processing apparatus according to claim 1, wherein the received information associated with the object included in the low-confidence region is received from a server.

12. An information processing method executed in an information processing apparatus, comprising:
- analyzing an image captured by a camera;
- executing object identification for identifying an object in at least one image region of a plurality of image regions in the captured image;
- setting a label, as an identification result, to each image region of the plurality of image regions in the captured image based on the object identification;
- analyzing the set label of each image region of the plurality of image regions in the captured image;
- determining a label confidence score for the set label of each image region of the plurality of image regions based on the analysis of the set label of each image region of the plurality of image regions,
  - wherein the label confidence score indicates a confidence of the object identification for the set label of each image region of the plurality of image regions;
- extracting a low-confidence region in the captured image based on the label confidence score for the set label of each image region of the plurality of image regions,
  - wherein a label confidence score of the low-confidence region is lowest among the plurality of image regions;
- receiving information associated with the object;
- analyzing an object region associated with the object based on the received information;
- updating a label of the low-confidence region based a matching rate between the object region analyzed from the received information and the low-confidence region being equal to or greater than a specified threshold value;
- extracting a high-confidence region in the captured image based on the label confidence score for the set label of each image region of the plurality of image regions,
  - wherein a label confidence score of the high-confidence region is highest among the plurality of image regions;
- calculating a matching rate between the low-confidence region and the high-confidence region; and
- updating, based on the received information, the label of the high-confidence region based on the matching rate between the low-confidence region and the high-confidence region being equal to or higher than the specified threshold value.

13. A non-transitory computer-readable medium having stored thereon, computer-executable instructions which, when executed by a computer, cause the computer to execute operations, the operations comprising:
- analyzing an image captured by a camera;
- executing object identification for identifying an object in at least one image region of a plurality of image regions in the captured of an image:
- setting a label, as an identification result, to each image region of the plurality of image regions in the captured image based on the object identification;
- analyzing the set label of each image region of the plurality of image regions in the captured image;
- determining a label confidence score for the set label of each image region of the plurality of image regions based on the analysis of the set label of each image region of the plurality of image regions,
  - wherein the label confidence score indicates a confidence of the object identification for the set label of each image region of the plurality of image regions;
- extracting a low-confidence region in the captured image based on the label confidence score for the set label of each image region of the plurality of image regions,
  - wherein a label confidence score of the low-confidence region is lowest among the plurality of image regions;
- receiving information associated with the object;
- analyzing an object region associated with the object based on the received information;
- updating a label of the low-confidence region based a matching rate between the object region analyzed from the received information and the low-confidence region being equal to or greater than a specified threshold value;
- extracting a high-confidence region in the captured image based on the label confidence score for the set label of each image region of the plurality of image regions,
  - wherein a label confidence score of the high-confidence region is highest among the plurality of image regions;
- calculating a matching rate between the low-confidence region and the high-confidence region; and
- updating, based on the received information, the label of the high-confidence region based on the matching rate between the low-confidence region and the high-confidence region being equal to or higher than the specified threshold value.

* * * * *